(12) United States Patent
Nakayama et al.

(10) Patent No.: US 10,723,228 B2
(45) Date of Patent: Jul. 28, 2020

(54) POWER SOURCE SYSTEM

(71) Applicant: TOYOTA JIDOSHA KABUSHIKI KAISHA, Toyota-shi, Aichi-ken (JP)

(72) Inventors: Shu Nakayama, Toyota (JP); Isao Yoneyama, Toyota (JP); Tomohiro Usami, Toyota (JP); Yasuharu Terada, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 74 days.

(21) Appl. No.: 15/612,297

(22) Filed: Jun. 2, 2017

(65) Prior Publication Data

US 2017/0349048 A1  Dec. 7, 2017

(30) Foreign Application Priority Data

Jun. 7, 2016  (JP) .................................. 2016-113755

(51) Int. Cl.
| | |
|---|---|
| *B60L 3/00* | (2019.01) |
| *B60L 1/00* | (2006.01) |
| *B60R 16/033* | (2006.01) |
| *B60L 50/50* | (2019.01) |
| *B60L 3/04* | (2006.01) |

(52) U.S. Cl.
CPC ............. *B60L 3/0092* (2013.01); *B60L 1/003* (2013.01); *B60L 3/0023* (2013.01); *B60L 3/04* (2013.01); *B60L 50/50* (2019.02); *B60R 16/033* (2013.01); *B60L 2210/10* (2013.01)

(58) Field of Classification Search
CPC .... B60L 3/00; B60L 1/00; B60L 11/18; B60L 3/04; B60R 16/033; H02J 9/06; H02J 7/00; H02J 7/34; B60W 10/26; B60W 10/30; H02M 3/00
See application file for complete search history.

(56) References Cited

U.S. PATENT DOCUMENTS 9,776,635 B2 * 10/2017 Khafagy ............... B60W 30/18
10,081,341 B2 * 9/2018 Goto ..................... B60T 13/662
(Continued)

FOREIGN PATENT DOCUMENTS

DE    10305357 A1   8/2004
EP    1056181 A2    11/2000
(Continued)

*Primary Examiner* — Jared Fureman
*Assistant Examiner* — Emmanuel Dominique
(74) *Attorney, Agent, or Firm* — Hunton Andrews Kurth LLP

(57) ABSTRACT

A power source system includes a first power source, a second power source, a Direct Current to Direct Current converter, a first load including a vehicle control device configured to perform predetermined control regarding at least one of traveling, steering, and braking of the vehicle regardless of a driving operation performed by a driver of the vehicle, and an electric actuator as a control target of the vehicle control device, and connected to the first path so as to be supplied with power from the first power source, and a power source control device configured to control an operation of the Direct Current to Direct Current converter such that power is supplied to the first path from the second power source in a case where the predetermined control is performed.

10 Claims, 20 Drawing Sheets

(56) References Cited

U.S. PATENT DOCUMENTS

| | | |
|---|---|---|
| 2006/0145536 A1 | 7/2006 | Hackl et al. |
| 2011/0039655 A1* | 2/2011 | Kaltenbach .............. B60K 6/48 |
| | | 477/5 |
| 2011/0320109 A1 | 12/2011 | Polimeno et al. |
| 2012/0228943 A1* | 9/2012 | Nakashima ........... H01M 10/42 |
| | | 307/66 |
| 2013/0313898 A1* | 11/2013 | Proebstle .............. H02J 7/1423 |
| | | 307/10.1 |
| 2015/0219725 A1* | 8/2015 | Fassnacht .............. G01R 29/02 |
| | | 324/426 |
| 2016/0288746 A1* | 10/2016 | Namuduri ............. B60R 16/033 |
| 2017/0080907 A1* | 3/2017 | Goto ........................ B60T 7/22 |

FOREIGN PATENT DOCUMENTS

| | | |
|---|---|---|
| EP | 1595748 A1 | 11/2005 |
| EP | 1958851 A1 | 8/2008 |
| EP | 3192705 A1 | 7/2017 |
| JP | H10-76965 A | 3/1998 |
| JP | H11-192958 A | 7/1999 |
| JP | 2010-026840 A | 2/2010 |
| JP | 2011-246114 A | 12/2011 |
| JP | 2015-020619 A | 2/2015 |
| JP | 2015-174533 A | 10/2015 |
| WO | 2015194110 A1 | 12/2015 |

\* cited by examiner ical Field

The present disclosure relates to a power source system.

2. Description of Related Art

There is an on-vehicle power source system in which a main power source, a sub-power source, and an electrical load are connected in parallel to each other, and connection and disconnection between the sub-power source and the electrical load can be performed (for example, Japanese Patent Application Publication No. 2011-246114 (JP 2011-246114 A)).

SUMMARY

Meanwhile, there is an advance driver assistance system (ADAS) including an adaptive cruise control (ACC) system, a lane keep assist (LKA) system, an automatic brake system, and the like, or a high-grade driving assistance system such as an automatic driving system. Such a high-grade driving assistance system includes a control device (electric control unit (ECU)) performing control regarding at least one of traveling, steering, and braking of a vehicle regardless of a driving operation performed by a driver. The high-grade driving assistance system includes an electric actuator which is a control target of the control device, such as an electric hydraulic pump included in, for example, an electric power steering (EPS) motor or a brake actuator. In addition to the main power source, the sub-power source is provided (that is, double power source systems) for an electrical load such as the control device or the electric actuator implementing the high-grade driving assistance system, and, thus, even if abnormality occurs in the main power source, the electrical load can be operated with power from the sub-power source, and thus reliability can be ensured.

However, in JP 2011-246114 A, after ignition of a vehicle is turned on, the sub-power source and the electrical load are electrically disconnected from each other as long as the sub-power source is not required to charge the electrical load. Thus, if abnormality occurs in the main power source, a time lag occurs until the supply of power from the sub-power source to the electrical load is started.

The present disclosure provides a power source system capable of operating an electrical load implementing a high-grade driving assistance system by supplying power thereto from a sub-power source without a time lag in a case where abnormality occurs in a main power source.

A power source system according to an aspect of the present disclosure includes: a first power source that is mounted on a vehicle; a second power source that is mounted on the vehicle; a Direct Current to Direct Current converter that is mounted on the vehicle and is connected to the second power source, and that is configured to adjust power supplied from the second power source so as to output the adjusted power to a first path connected to the first power source; a first load that is mounted on the vehicle, includes a vehicle control device configured to perform predetermined control regarding at least one of traveling, steering, and braking of the vehicle regardless of a driving operation performed by a driver of the vehicle, and an electric actuator as a control target of the vehicle control device, and is connected to the first path so as to be supplied with power from the first power source; and a power source control device that is mounted on the vehicle, and is configured to control an operation of the Direct Current to Direct Current converter such that power is supplied to the first path from the second power source in a case where the predetermined control is performed.

According to the aspect, in a case where the predetermined control realizing a high-grade driving assistance system is performed, power from the second power source is supplied to the first path via the DC-DC converter. In other words, during execution of the predetermined control, power from the second power source is supplied to the first load realizing the high-grade driving assistance system via the first path. Thus, even if the first power source fails, and thus power is not supplied from the first power source to the first load, the high-grade driving assistance system can be continuously operated as a result of the supply of power from the second power source without a time lag.

In the aspect, the power source control device may be configured to supply power from the second power source to the first path such that a voltage which is output from the Direct Current to Direct Current converter to the first path substantially matches a voltage of the first power source.

According to the aspect, specifically, power from the second power source can be supplied to the first path via the DC-DC converter.

In the aspect, the power source control device may be configured to control an operation of the Direct Current to Direct Current converter such that power from the second power source is not supplied to the first path in a case where the predetermined control is not performed.

According to the aspect, in a case where the predetermined control is not performed, power is not supplied to the first load from the second power source via the first path, and thus it is possible to reduce consumption of power from the second power source. Thus, consumption of power from the second power source can be reduced, and, even if the first power source fails, and thus power is not supplied from the first power source to the first load, the high-grade driving assistance system can be continuously operated as a result of the supply of power from the second power source without a time lag.

The power source system according to the aspect may further includes a first relay that is mounted on the vehicle, wherein the first load may be connected to a second path diverging from the first path, wherein the first relay may be provided at a portion closer to the first power source than a junction with the second path on the first path, and wherein the power source control device may be configured to: maintain the first relay in an ON state in a case where abnormality in the first power source is not detected; and bring the first relay into an OFF state in a case where abnormality in the first power source is detected.

According to the aspect, in a case where abnormality in the first power source is not detected, the first relay is maintained in a closed state so that power from the first power source is supplied to the first load realizing the high-grade driving assistance system. In a case where abnormality in the first power source is detected, the first relay is brought into an opened state so that power from the second power source is not supplied to the first power source. Thus, when the first power source fails, it is possible to prevent power supplied to the first load realizing the high-grade driving assistance system from the second power source from being reduced due to the power from the second power source being supplied to the first power source.

The power source system according to the aspect may further includes a second relay that is mounted on the vehicle, and is provided on the second path, wherein the power source control device may be configured to: bring the second relay into an ON state in a case where the predetermined control is performed; and bring the second relay into an OFF state in a case where abnormality in the first power source is detected, and a braking operation performed by a driver of the vehicle is detected, even when the predetermined control is performed.

According to the aspect, in a case where the predetermined control is performed, fundamentally, the second relay is in a closed state so that the first load related to the predetermined control is operated with power from the second power source. On the other hand, even in a case where the predetermined control is performed, if abnormality in the first power source is detected, and a driver performs a braking operation, the second relay is brought into an opened state so that power is not supplied to the first load from the second power source. Thus, in a case where the driver wants to stop the vehicle through the braking operation when abnormality occurs in the first power source, it is possible to prevent the occurrence of a competitive situation between the predetermined control and the braking operation. In other words, the vehicle can be appropriately stopped through the braking operation performed by the driver.

In the aspect, the first power source may include a first power storage device, and the power source control device may be configured to bring the first relay into an OFF state in a case where abnormality in the first power source is detected, and the abnormality in the first power source includes abnormality in the first power storage device.

According to the aspect, in a case where abnormality in the first power source includes abnormality in the first power storage device, the first relay is brought into an opened state so that power from the second power source is not supplied to the first power source including the first power storage device. Thus, it is possible to prevent a situation in which power from the second power source wastefully flows into the failed first power storage device, and thus a capacity of the second power source is reduced.

In the aspect, the second power source may include a second power storage device, and the power source control device may be configured to bring the first relay into an OFF state in a case where abnormality in the first power source is detected, and a state of charge of the second power storage device is equal to or less than a predetermined threshold value.

According to the aspect, when the first power source is abnormal, the first relay is brought into an opened state in a case where a state of charge of the second power storage device included in the second power source is equal to or less than a predetermined threshold value, that is, the state of charge is reduced. Thus, it is possible to prevent power from the second power source from flowing into the first power source side in a situation in which a residual capacity of the second power storage device is not sufficient.

The power source system according to the aspect may further includes a second load that is mounted on the vehicle, performs at least one of traveling and stopping of the vehicle in response to the driving operation performed by the driver of the vehicle, and is connected to a third path diverging from between the first relay and the Direct Current to Direct Current converter on the first path.

Here, a system realizing traveling of a vehicle in response to a driving operation performed by a driver of the vehicle is, for example, a shift-by-wire (SBW) system, and, a system realizing stopping of the vehicle in response to a driving operation performed by the driver of the vehicle is, for example, an electric parking brake (EPB) system.

According to the aspect, even in a case where abnormality in the first power source is detected, and the first relay is brought into an opened state, power from the second power source can be supplied to the second load related to the system required for traveling or stopping of a vehicle via the third path.

The power source system according to the aspect may further includes a third load that is mounted on the vehicle, has an operation priority lower than operation priorities of the first load and the second load, and is connected to a fourth path diverging from between the first power source and the first relay on the first path.

According to the aspect, since the first relay is brought into an opened state in a case where abnormality in the first power source is detected, it is possible to prevent a situation in which power from the second power source is used to operate the third load whose operation priority is lower than that of the first load or the second load, and thus a capacity of the second power source is reduced.

In the aspect, the predetermined control may cause intervention for steering or braking the vehicle regardless of the driving operation performed by the driver of the vehicle if a predetermined intervention condition is established, and the power source control device may be configured to control the operation of the Direct Current to Direct Current converter such that power from the second power source is supplied to the first path in a case where the predetermined control is performed, and it is determined that a situation occurs in which the intervention is more preferentially performed than the driving operation performed by the driver of the vehicle.

Here, for example, in a case where a frequency of the number of times of the predetermined control, that is, intervention in a driving operation based on intervention control is equal to or more than a predetermined criterion, or current consumption in the first load is equal to or more than a predetermined criterion, the power source system may determine that a situation occurs in which intervention based on the predetermined control is more preferentially performed than a driving operation performed by a driver.

According to the aspect, even during execution of the predetermined control, power can be made not to be supplied to the first load or the like realizing the high-grade driving assistance system from the second power source via the first path until a situation occurs in which intervention based on the predetermined control is more preferentially performed than a driving operation performed by a driver. Thus, it is possible to reduce consumption of power drawn out from the second power source.

According to the aspect, it is possible to provide a power source system capable of operating an electrical load implementing a high-grade driving assistance system by supplying power thereto from a sub-power source without a time lag in a case where abnormality occurs in a main power source.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, best modes for carrying out the disclosure will be described with reference to the drawings.

First, with reference to FIG. 1, a description will be made of a power source system 1.

Figure 1:
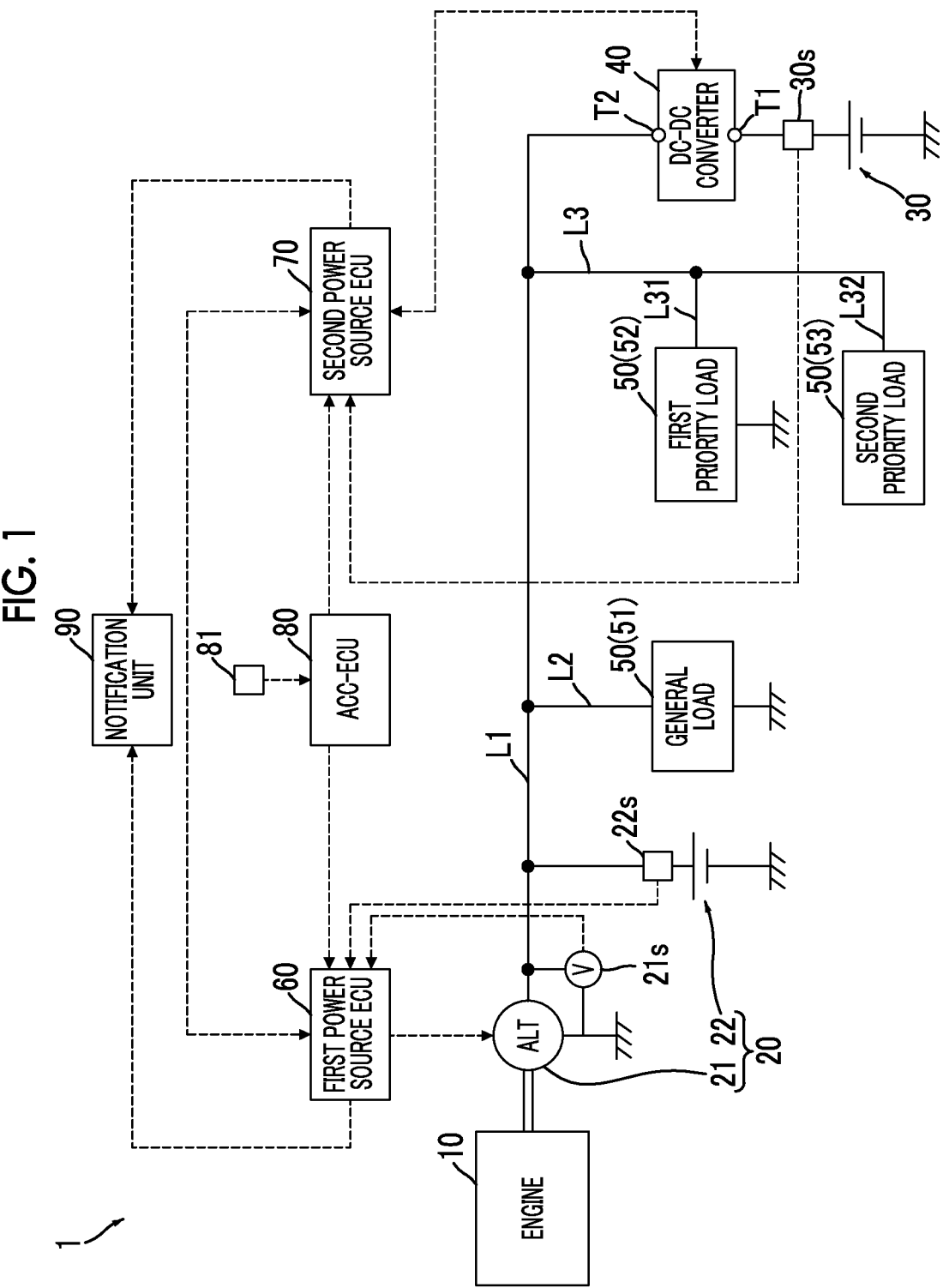
FIG. 1 is a configuration diagram schematically illustrating an example of a configuration of a power source system according to a first embodiment.

FIG. 1 is a configuration diagram schematically illustrating an example of a configuration of the power source system 1 according to the present embodiment.

In FIG. 1, a double line indicates mechanical power system, a solid line indicates a power system, and a dotted line (arrow) indicates a control/signal system.

The power source system 1 is mounted on a vehicle having an engine 10 as a drive power source, and includes a main power source 20, a voltage sensor 21s, a battery sensor 22s, a sub-battery 30, a battery sensor 30s, a Direct Current to Direct Current (DC-DC) converter 40, accessory loads 50, a first power source electronic control unit (ECU) 60, a second power source ECU 70, an ACC-ECU 80, an operation switch 81, and a notification unit 90. Hereinafter, the "vehicle" indicates a vehicle mounted with the power source system 1 unless otherwise mentioned.

The main power source 20 (an example of a first power source) includes an alternator 21 and a main battery 22 which are connected in parallel to each other, and supplies power to the accessory loads 50. The main power source 20 is connected to the DC-DC converter 40 via a power path L1 (an example of a first path).

The alternator 21 is a DC generator driven by power of the engine 10, and is formed of an AC generator, a rectifier which converts three-phase AC power from the AC generator into DC power, and the like. The alternator 21 generates power by using power of the engine 10 which is transmitted from a crank shaft of the engine 10 via a belt. The alternator 21 includes a regulator, and the regulator can control a power generation voltage (that is, a power generation amount) of the alternator 21 by controlling an excitation current flowing through a rotor coil of the alternator 21. The power generated by the alternator 21 is accumulated in the main battery 22 and the sub-battery 30, or is supplied to the accessory loads 50 or the like as drive electric power.

The voltage sensor 21s detects a voltage Va between terminals of the alternator 21. The voltage Va of the alternator 21 detected by the voltage sensor 21s is transmitted to the first power source ECU 60 via a one-to-one communication line or an on-vehicle network such as a controller area network (CAN).

The main battery 22 supplies power to the accessory loads 50. The main battery 22 is a secondary battery such as a lead battery, a nickel-hydrogen battery, or a lithium ion battery having a rated voltage of 12 V, and may supply a voltage of about 12 V to 15 V to the accessory loads 50 according to a charging state thereof. The main battery 22 may accumulate generated power supplied from the alternator 21 therein.

The battery sensor 22s is known detection means for detecting various states (a voltage, a current, a temperature, a charging state, and a deterioration state) of the main battery 22. The battery sensor 22s includes, for example, a voltage sensor detecting a voltage Vm of the main battery 22, a current sensor detecting a current Im thereof, and a temperature sensor detecting a temperature thereof. The battery sensor 22s includes, for example, a calculation processing unit which calculates a state of charge (SOC) (charging ratio) or a state of health (SOH) (deterioration state) of the main battery 22 on the basis of detection signals from the built-in current sensor, voltage sensor and temperature sensor. The battery sensor 22s is communicably connected to the first power source ECU 60 via a one-to-one communication line or an on-vehicle network such as a CAN, and detection signals corresponding to various states of the main battery 22 are step difference to the first power source ECU 60.

The sub-battery 30 (an example of a second power source) has a positive terminal (high voltage terminal) connected to the DC-DC converter 40, and supplies power to the accessory loads 50 via the DC-DC converter 40. The sub-battery 30 is, for example, a secondary battery such as a nickel-hydrogen battery or a lithium ion battery having a rated voltage of 12 V, and supplies a voltage of about 12 V to 15 V to the DC-DC converter 40 according to a charging state thereof. The sub-battery 30 is connected to the alternator 21 via the DC-DC converter 40 and the power path L1, and may accumulate the generated power supplied from the alternator 21 therein.

The battery sensor 30s is known detection means for detecting various states (a voltage, a current, a temperature, a charging state, and a deterioration state) of the sub-battery 30. The battery sensor 30s includes, for example, a voltage sensor detecting a voltage Vs of the sub-battery 30, a current sensor detecting a current Is thereof, and a temperature sensor detecting a temperature thereof. The battery sensor 30s includes, for example, a calculation processing unit which calculates a state of charge (SOC) (charging ratio) or a state of health (SOH) (deterioration state) of the sub-battery 30 on the basis of detection signals from the built-in current sensor, voltage sensor and temperature sensor. The battery sensor 30s is communicably connected to the second power source ECU 70 via a one-to-one communication line or an on-vehicle network such as a CAN, and detection signals corresponding to various states of the sub-battery 30 are step difference to the second power source ECU 70.

The DC-DC converter 40 is a bidirectional power conversion device which has one end (terminal T1) connected to the sub-battery 30 (the positive terminal thereof) and the other end (terminal T2) connected to the power path L1 reaching the main power source 20 (the alternator 21 and the main battery 22). The DC-DC converter 40 is communicably connected to the second power source ECU 70, and is operated in response to a drive command from the second power source ECU 70 (specifically, a DDC control unit 701 which will be described later).

The DC-DC converter 40 may adjust (for example, steps up) a voltage of the sub-battery 30 which is input via the terminal T1, so as to supply the adjusted voltage to the power path L1 from the terminal T2. In other words, the DC-DC converter 40 can determine whether or not power is supplied to the power path L1 and can also adjust an amount of power from the sub-battery 30, supplied to the power path L1, by adjusting a voltage output from the terminal T2. Specifically, the DC-DC converter 40 may adjust a voltage output via the terminal T2 to be lower than the voltage Va of the alternator 21 so that power from the sub-battery 30 is not supplied to the power path L1. The DC-DC converter 40 may adjust a voltage output via the terminal T2 to be equal to or higher than the voltage Va of the alternator 21 so that power from the sub-battery 30 is supplied to the power path L1, and may increase a voltage output via the terminal T2 so that an amount of power supplied to the power path L1 from the sub-battery 30 is adjusted.

The DC-DC converter 40 may adjust (for example, steps up) a voltage of the generated power from the alternator 21, which is input via the terminal T1 through the power path L1, so as to supply an adjusted voltage to the sub-battery 30 via the terminal T2. In other words, the DC-DC converter 40 can determine whether or not power is supplied to the sub-battery 30 and can also adjust an amount of power supplied to the sub-battery 30 from the power path L1 (alternator 21), by adjusting a voltage output from the terminal T1.

The DC-DC converter 40 includes sensors or circuits detecting voltages Vd1 and Vd2 at the terminals T1 and T2 in order to adjust the voltages Vd1 and Vd2 at the terminals T1 and T2 to setting values Vd1set and Vd2set corresponding to drive commands from the second power source ECU 70. The DC-DC converter 40 transmits detection signals corresponding to the detected voltages Vd1 and Vd2 at the terminals T1 and T2, to the second power source ECU 70.

The accessory loads 50 are on-vehicle electrical loads supplied with power from the main power source 20 (the alternator 21 and the main battery 22) and the sub-battery 30. The accessory loads 50 include a general load 51, a first priority load 52, and a second priority load 53.

The general load 51 (an example of a third load) includes, for example, wipers, an air conditioner, and lightings mounted on a vehicle. The general load 51 is connected to a power path L2 diverging from the power path L1, and is connected to the main power source 20 (the alternator 21 and the main battery 22) and the sub-battery 30 via the power path L1 and the power path L2.

The first priority load 52 is an on-vehicle electrical load (whose operation priority is high) which is highly required to be operated in preference to the general load 51. A vehicle mounted with the power source system 1 according to the present embodiment is mounted with an advance driver assistance system (ADAS) including an ACC system, an LKA system, an automatic brake system, and the like, or a high-grade driving assistance system such as an automatic driving system, and the first priority load 52 is an on-vehicle electrical load implementing the high-grade driving assistance system. Specifically, the first priority load 52 includes various ECUs (an example of a vehicle control device) performing predetermined control regarding at least one of traveling, steering, and braking of a vehicle regardless of a driving operation performed by a driver, sensors detecting various vehicular states monitored by the various ECUs, and electric actuators which are control targets of the various ECUs. The predetermined control related to the high-grade driving assistance system is performed regardless of a driving operation performed by a driver, and thus has the high operation priority from the viewpoint of safety.

The first priority load 52 includes the ACC-ECU 80 performing vehicle control regarding an ACC system which is an example of the high-grade driving assistance system, but is illustrated separately from the first priority load 52 in FIG. 1 for convenience of description.

The second priority load 53 is an on-vehicle electrical load (whose operation priority is high) which is highly required to be operated in preference to the general load 51 in the same manner as the first priority load 52. Specifically, the second priority load 53 is an on-vehicle electrical load related to a system (for example, an SBW system or an EPB system) realizing at least one of traveling and stopping of a vehicle according to a driving operation performed by a driver. Various ECUs, sensors, and actuators in the system have the high operation priority from the viewpoint of safety in order to appropriately realize traveling and stopping of a vehicle according to a driving operation performed by a driver.

The first priority load 52 and the second priority load 53 are connected to a power path L3 diverging from the power path L1, and are connected to the main power source 20 (the alternator 21 and the main battery 22) and the sub-battery 30 via the power path L1 and the power path L3. Specifically, the power path L3 further branches into a power path L31 and a power path L32, which are respectively connected to the first priority load 52 and the second priority load 53.

The first power source ECU 60 and the second power source ECU 70 (examples of power source control devices) are electronic control units controlling the supply of power from the main power source 20 and the sub-battery 30 to the accessory loads 50 in cooperation with each other. Each of the first power source ECU 60 and the second power source ECU 70 is mainly formed of a microcomputer or the like, and can perform various control processes which will be described later by executing various programs stored in a ROM on a CPU. Hereinafter, with reference to FIGS. 2 and 3, functional units of the first power source ECU 60 and the second power source ECU 70 will be described.

There may be a configuration in which some or all functions of the first power source ECU 60 are realized by the second power source ECU 70, and there may be a configuration in which some or all functions of the second power source ECU 70 are realized by the first power source ECU 60. There may be a configuration in which some or all functions of at least one of the first power source ECU 60 and the second power source ECU 70 realized by the other ECU. There may be a configuration in which of at least one of the first power source ECU 60 and the second power source ECU 70 may realize some or all functions of the other ECU.

Figure 2:
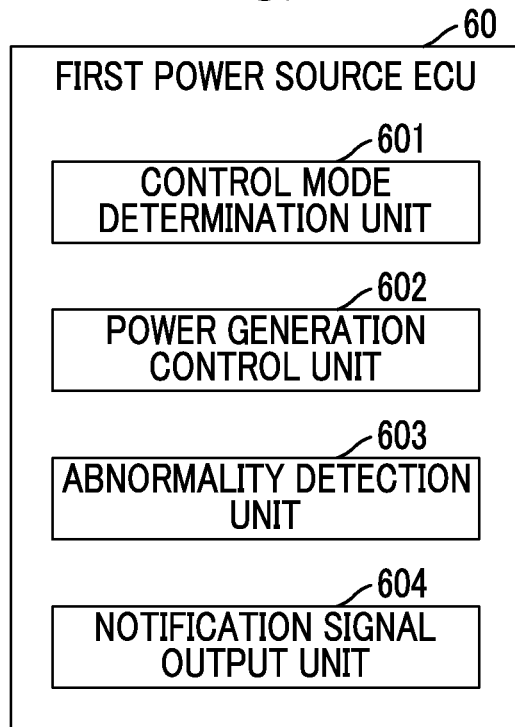
FIG. 2 is a functional block diagram of a first power source ECU according to the first embodiment.
Figure 3:
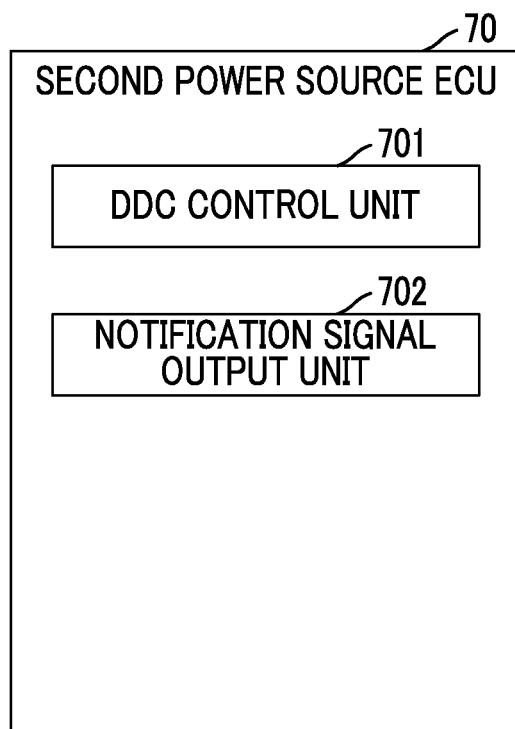
FIG. 3 is a functional block diagram of a second power source ECU according to the first embodiment.

FIGS. 2 and 3 are respectively functional block diagrams of the first power source ECU 60 and the second power source ECU 70.

First, as illustrated in FIG. 2, the first power source ECU 60 includes a control mode determination unit 601, a power generation control unit 602, and an abnormality detection unit 603, as functional units realized by executing one or more programs stored in the ROM on the CPU.

The control mode determination unit 601 determines a control mode in the power source system 1 (the first power source ECU 60 and the second power source ECU 70) on the basis of conditions predefined in advance. As will be described later, the first power source ECU 60 and the second power source ECU 70 have a plurality of control modes, specifically, a normal mode, a high-grade driving assistance mode, an evacuative traveling mode, a manual stop mode, an emergency stop mode, and a stop maintaining mode, and the control mode determination unit 601 performs a process of determining a control mode.

The power generation control unit 602 controls power generation in the alternator 21. The power generation control unit 602 outputs, to the alternator 21, a control command including an indication voltage Va_set which is an indicative value of a voltage generated by the alternator 21. Consequently, the regulator of the alternator 21 adjusts an excitation current in response to the control command, so that the generated voltage Va in the alternator 21 converges on the indication voltage Va_set.

The abnormality detection unit 603 detects abnormalities in the main power source 20, that is, the alternator 21 and the main battery 22 on the basis of detection signals received from the voltage sensor 21s and the battery sensor 22s. For example, in a case where the voltage Va of the alternator 21 detected by the voltage sensor 21s is lower than a predetermined criterion despite rotation of the engine 10, the abnormality detection unit 603 detects abnormality in the alternator 21. For example, in a case where the voltage Vm of the main battery 22 detected by the battery sensor 22s is not higher than a predetermined criterion despite the alternator 21 continuously generating power, the abnormality detection unit 603 detects abnormality in the main battery 22. In a case where an SOH of the main battery 22 calculated by the battery sensor 22s deteriorates more than a predetermined criterion, the abnormality detection unit 603 detects abnormality in the main battery 22.

A notification signal output unit 604 generates a notification signal including the content of which a user (a driver or the like) of a vehicle is notified, and outputs the notification signal to the notification unit 90.

Next, as illustrated in FIG. 3, the second power source ECU 70 includes the DDC control unit 701 and a notification signal output unit 702, as functional units realized by executing one or more programs stored in the ROM on the CPU.

The DDC control unit 701 controls an operation of the DC-DC converter 40. The DDC control unit 701 may output a drive command including the setting value Vd1 set so that the voltage Vd1 at the terminal T1 of the DC-DC converter 40 is adjusted to the setting value Vd1 set. The DDC control unit 701 may output a drive command including the setting value Vd2set so that the voltage Vd2 at the terminal T2 of the DC-DC converter 40 is adjusted to the setting value Vd2set.

The notification signal output unit 702 generates a notification signal including the content of which a user (a driver or the like) of a vehicle is notified, and outputs the notification signal to the notification unit 90.

The ACC-ECU 80 (an example of a vehicle control device) is an electronic control unit which performs vehicle control (ACC control) regarding an ACC system which is an example of the high-grade driving assistance system. The ACC-ECU 80 starts ACC control if a user performs an ON operation on the operation switch 81, or a predetermined trigger condition is established, between ignition ON (IG-ON) and ignition OFF (IG-OFF) of the vehicle. The predetermined trigger condition is that, for example, "a vehicle has passed through a ramp of a highway (the vehicle has passed through an electronic toll collection (ETC) gate)".

As an example of the ACC control, in a case where a preceding vehicle is detected by an object detection device such as a millimeter-wave radar, the ACC-ECU 80 performs following traveling control while maintaining a distance to the preceding vehicle in a predetermined distance regardless of a driving operation performed by a driver. Another example of the ACC control, in a case where a preceding vehicle is not detected, the ACC-ECU 80 performs traveling control while maintaining a vehicle speed at a set speed regardless of a driving operation performed by the driver. The ACC-ECU 80 is communicably connected to the first power source ECU 60 and the second power source ECU 70 via an on-vehicle network such as a CAN. If the ACC control is started, the ACC-ECU 80 transmits a signal (start signal) indicating that the ACC control is started to the first power source ECU 60 and the second power source ECU 70.

The operation switch 81 is an operation portion operated by the user (driver) in order to start the ACC control. The operation switch 81 may include an operation portion performing various setting operations (for example, setting of a speed in a case where there is not preceding vehicle) in the ACC control. The operation switch 81 is communicably connected to the ACC-ECU 80 via a one-to-one communication line or the like, and an operation signal indicating the operation content in the operation switch 81 is transmitted to the ACC-ECU 80.

The notification unit 90 sends various notifications to the user in response to notification signals transmitted from the first power source ECU 60 and the second power source ECU 70. The notification unit 90 includes, for example, a display for visually sending a notification to the user, or a speaker for sending a notification to the user in voices.

Next, with reference to FIGS. 4 to 8, control processes performed by the first power source ECU 60 and the second power source ECU 70 will be described in detail.

Figure 4:
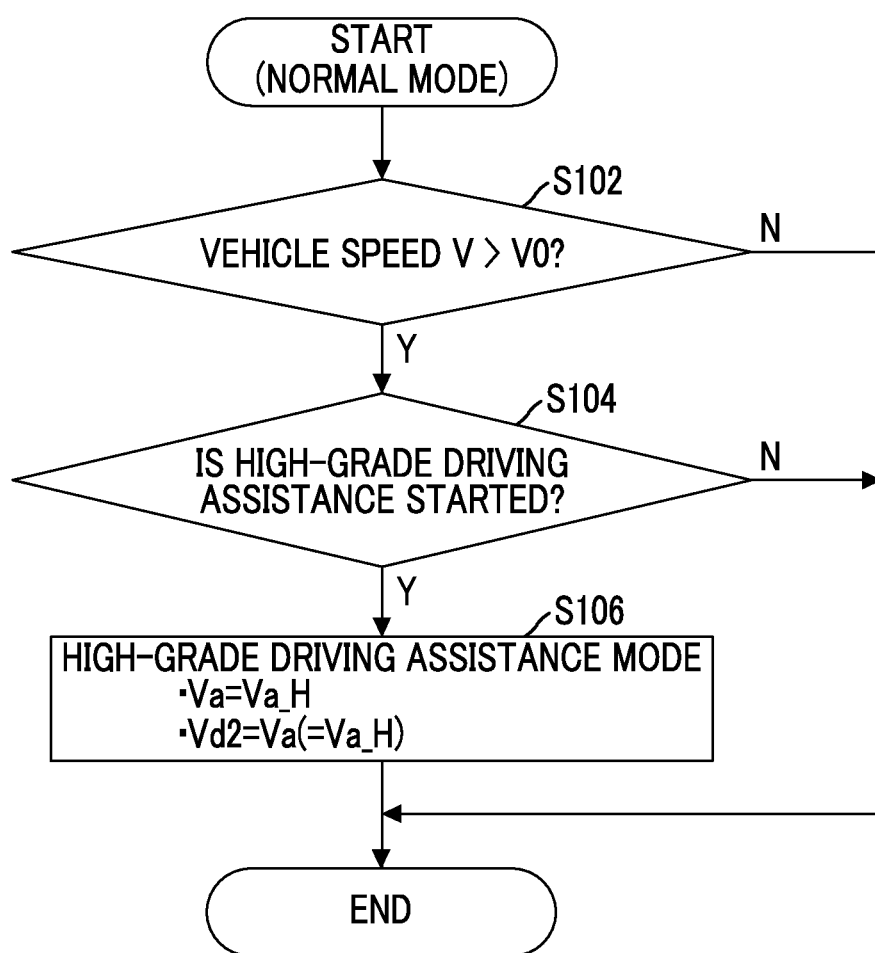
FIG. 4 is a flowchart schematically illustrating an example of a normal mode process in the power source system according to the first embodiment.
Figure 5:
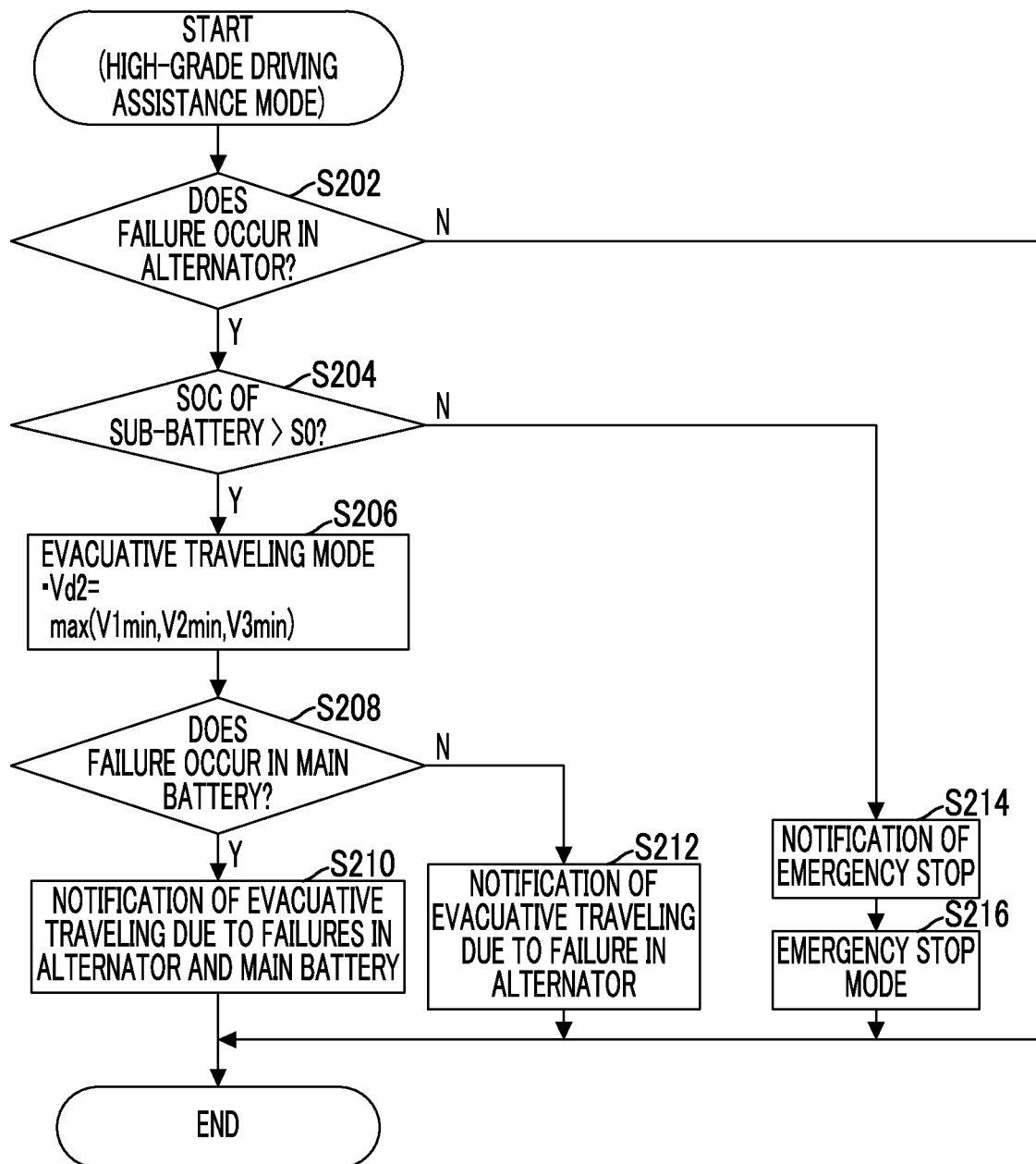
FIG. 5 is a flowchart schematically illustrating an example of a high-grade driving assistance mode process in the power source system according to the first embodiment.
Figure 6:
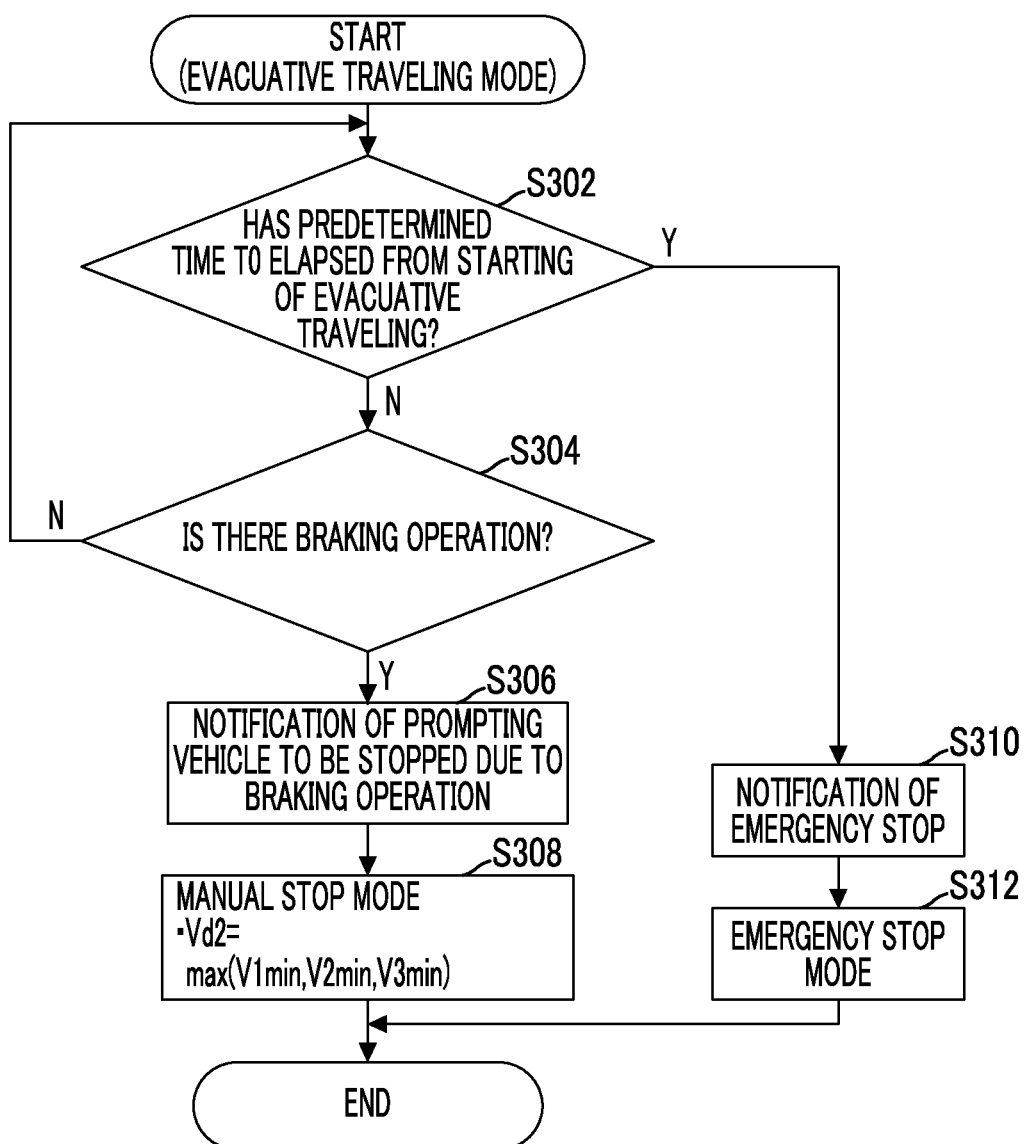
FIG. 6 is a flowchart schematically illustrating an example of an evacuative traveling mode process in the power source system according to the first embodiment.
Figure 7:
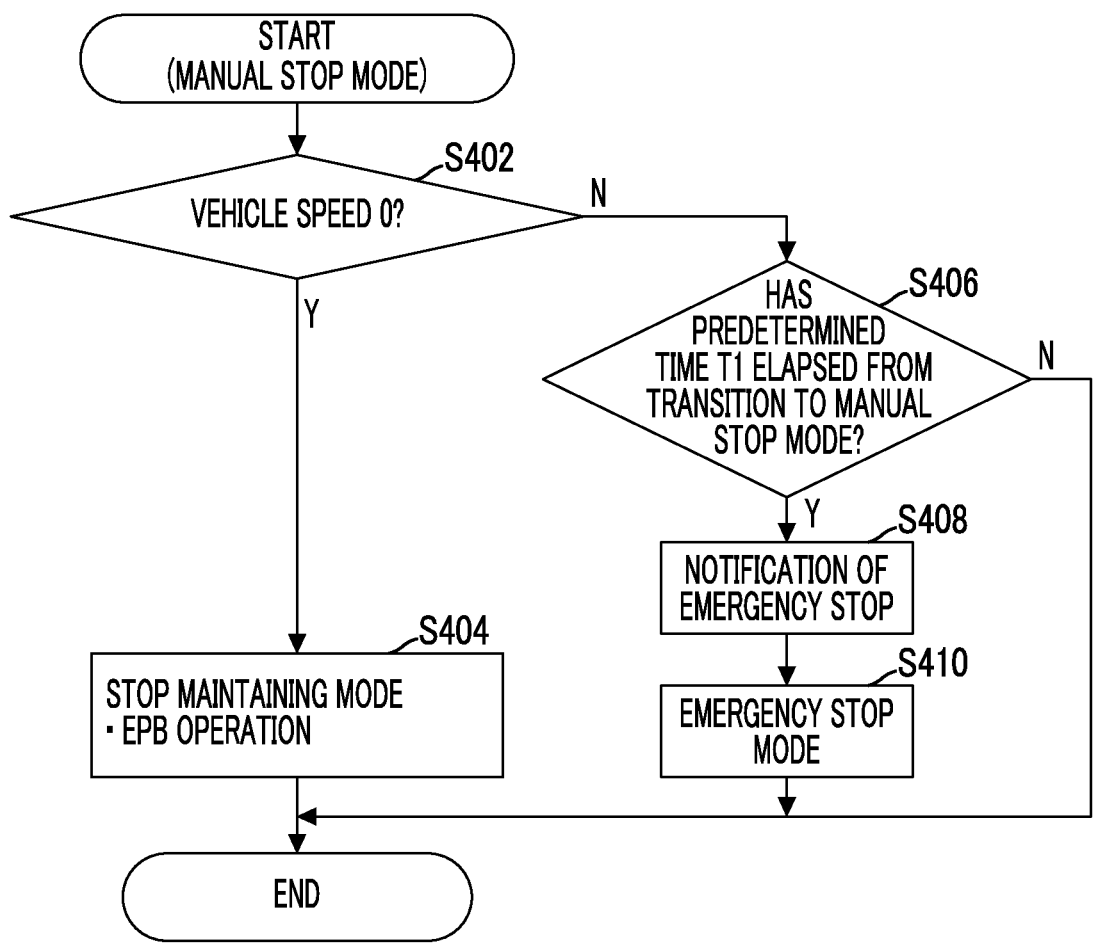
FIG. 7 is a flowchart schematically illustrating an example of a manual stop mode process in the power source system according to the first embodiment.
Figure 8:
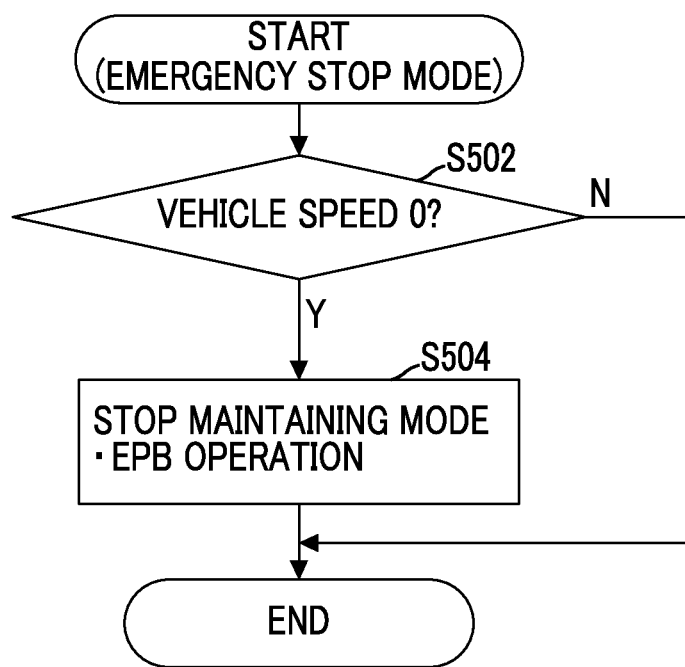
FIG. 8 is a flowchart schematically illustrating an example of an emergency stop mode process in the power source system according to the first embodiment.

FIG. 4 is a flowchart schematically illustrating an example of a control process (normal mode process) in a normal mode, performed by the first power source ECU 60 and the second power source ECU 70. FIG. 5 is a flowchart schematically illustrating an example of a control process (high-grade driving assistance mode process) in a high-grade driving assistance mode, performed by the first power source ECU 60 and the second power source ECU 70. FIG. 6 is a flowchart schematically illustrating an example of a control process (evacuative traveling mode process) in an evacuative traveling mode, performed by the first power source ECU 60 and the second power source ECU 70. FIG. 7 is a flowchart schematically illustrating an example of a control process (manual stop mode process) in a manual stop mode, performed by the first power source ECU 60 and the second power source ECU 70. FIG. 8 is a flowchart schematically illustrating an example of a control process (emergency stop mode process) in an emergency stop mode, performed by the first power source ECU 60 and the second power source ECU 70.

In a case where there is no abnormality in the main power source 20 (specifically, in a case where there is no abnormality in the alternator 21), a control mode is set to the normal mode as an initial setting after IG-ON of the vehicle.

First, with reference to FIG. 4, a description will be made of a normal mode process performed by the first power source ECU 60 and the second power source ECU 70. The process in this flowchart is repeatedly performed at a predetermined time interval in the normal mode.

In the normal mode, the alternator 21 and the DC-DC converter 40 may be in any control states. For example, in the normal mode, the power generation control unit 602 may maintain the generated voltage Va in the alternator 21 to be a voltage Va_M (for example, 13.0 V) for maintaining an SOC of the main battery 22 to be a relatively high state (for example, SOC=95% state). For example, the power generation control unit 602 may control the generated voltage Va in the alternator 21 on the basis of an SOC of the main battery 22. In other words, the power generation control unit 602 may control the generated voltage Va to be a relatively low voltage Va_L (for example, 12.7 V) if an SOC of the main battery 22 is relatively high, and may control the generated voltage Va to be a relatively high predetermined value Va_H if an SOC of the main battery 22 is relatively low. For example, in the normal mode, the DDC control unit 701 may control the voltage Vd2 at the terminal T2 to be a relatively low predetermined value Vd2_L so that power from the sub-battery 30 is not supplied to the power path L1. For example, in the normal mode, the DDC control unit 701 may control the voltage Vd1 at the terminal T1 to be a relatively high predetermined value Vd1_H during deceleration of the vehicle in order to accumulate regenerated power in the alternator 21 in the sub-battery 30.

In step S102, the control mode determination unit 601 determines whether or not a vehicle speed V is equal to or higher than a predetermined speed V0 on the basis of a vehicle speed signal received from a vehicle speed sensor (not illustrated). The control mode determination unit 601 proceeds to step S104 in a case where the vehicle speed V is equal to or higher than the predetermined speed V0, and finishes the present process in a case where the vehicle speed V is not equal to or higher than the predetermined speed V0.

In step S104, the control mode determination unit 601 determines whether or not high-grade driving assistance (ACC in the present embodiment) is started on the basis of the presence or absence of a start signal received from the ACC-ECU 80. The control mode determination unit 601 proceeds to step S106 in a case where the high-grade driving assistance is started, and finishes the present process in a case where the high-grade driving assistance is not started.

In step S106, the control mode determination unit 601 causes a control mode to transition to the high-grade driving assistance mode, and finishes the present process.

In the high-grade driving assistance mode, the power generation control unit 602 controls an operation of the alternator 21 so that the generated voltage Va in the alternator 21 becomes a relatively high predetermined voltage Va_H. Consequently, an amount of power generated by the alternator 21 is increased, and thus an amount of power supplied to the main battery 22 or the accessory loads 50 is increased. Therefore, since the high-grade driving assistance is started, and a relatively large current is required to drive the first priority load 52 (particularly, the electric actuator), an amount of power generated by the alternator 21 is increased, and thus it is possible to reliably execute the high-grade driving assistance. In the high-grade driving assistance mode, the DDC control unit 701 controls the DC-DC converter 40 so that the voltage Vd2 at the terminal T2 of the DC-DC converter 40 is the same as (substantially matches) the voltage Va (=Va_H) of the alternator 21. Consequently, power from the sub-battery 30 is supplied to the power path L1 via the DC-DC converter 40. In other words, power from the sub-battery 30 is supplied to the accessory loads 50 via the power path L1.

Next, with reference to FIG. 5, a description will be made of a high-grade driving assistance mode process performed by the first power source ECU 60 and the second power source ECU 70. The process in this flowchart is repeatedly performed at a predetermined time interval in the high-grade driving assistance mode.

In step S202, the control mode determination unit 601 determines whether or not abnormality in the alternator 21 is detected by the abnormality detection unit 603. The control mode determination unit 601 proceeds to step S204 in a case where abnormality in the alternator 21 is detected, and finishes the present process in a case where abnormality in the alternator 21 is not detected.

In step S204, the control mode determination unit 601 determines whether or not a residual capacity of the sub-battery 30 is sufficient, that is, an SOC of the sub-battery 30 is higher than a predetermined threshold value S0. In a case where an SOC of the sub-battery 30 is higher than the predetermined threshold value S0, the control mode determination unit 601 proceeds to step S206, and proceeds to step S214 in a case where an SOC of the sub-battery 30 is not higher than the predetermined threshold value S0.

In step S206, the control mode determination unit 601 causes a control mode to transition the evacuative traveling mode.

In the evacuative traveling mode, the DDC control unit 701 controls an operation of the DC-DC converter 40 so that the voltage Vd2 at the terminal T2 of the DC-DC converter 40 becomes the allowable lowest voltage of the accessory loads 50. Specifically, the DDC control unit 701 controls an operation of the DC-DC converter 40 so that the voltage Vd2 at the terminal T2 becomes the maximum value among the respective allowable lowest voltages V1min, V2min, V3min of the general load 51, the first priority load 52, and the second priority load 53. Consequently, in a situation in which abnormality occurs in the alternator 21, the accessory loads 50 can be operated as a result of being supplied with power from the sub-battery 30. The voltage Vd2 supplied from the DC-DC converter 40 to the accessory loads 50 is limited to the allowable lowest voltage, and thus the accessory loads 50 can be driven for a longer period of time with power from the sub-battery 30.

In the evacuative traveling mode, the alternator 21 may be in any control state. For example, in the evacuative traveling mode, a failure occurs in the alternator 21, and thus the power generation control unit 602 performs control of restricting power generation in the alternator 21 (for example, restricting an excitation current). The first power source ECU 60 may acquire information regarding an SOC of the sub-battery 30 from the second power source ECU 70 via an on-vehicle network such as a CAN. In the evacuative traveling mode, a speed of the vehicle is restricted to be considerably low. Thus, in a case where a control mode transitions to the evacuative traveling mode, the first power source ECU 60 (or the second power source ECU 70) notifies an ECU (for example, an electronic fuel injection (EFI)-ECU) controlling an operation of the engine 10 of the content that a control mode transitions to the evacuative traveling mode.

In step S208, the abnormality detection unit 603 determines whether or not abnormality in the main battery 22 is detected. The abnormality detection unit 603 proceeds to step S210 in a case where abnormality in the main battery 22 is detected, and proceeds to step S212 in a case where abnormality in the main battery 22 is not detected.

In step S210, the notification signal output unit 604 outputs a notification signal indicating the content that evacuative traveling is performed due to failures in the alternator 21 and the main battery 22, to the notification unit 90. Consequently, the notification unit 90 notifies the user (a driver or the like) of the vehicle of the content that evacuative traveling is performed due to failures in both of the alternator 21 and the main battery 22.

In step S212, the notification signal output unit 604 outputs a notification signal indicating the content that evacuative traveling is performed due to a failure in the alternator 21, to the notification unit 90. Consequently, the notification unit 90 notifies the user (a driver or the like) of the vehicle of the content that evacuative traveling is performed due to a failure in the alternator 21.

On the other hand, in a case where it is determined that an SOC of the sub-battery 30 is not higher than the predetermined threshold value S0 in step S204, the notification signal output unit 604 outputs a notification signal indicating the content that an emergency stop is performed, to the notification unit 90 in step S214. Consequently, the notification unit 90 notifies the user (a driver or the like) of the vehicle of the content that an emergency stop is performed.

In step S216, the control mode determination unit 601 causes a control mode to transition to the emergency stop mode, and finishes the present process.

When a control mode transitions to the emergency stop mode, the control mode determination unit 601 may output an emergency stop request to, for example, a brake ECU controlling an operation of a brake device of the vehicle so as to automatically stop the vehicle. In the emergency stop mode, the alternator 21 and the DC-DC converter 40 may be in any control states.

Next, with reference to FIG. 6, a description will be made of an evacuative traveling mode process performed by the first power source ECU 60 and the second power source ECU 70. The process in this flowchart is repeatedly performed at a predetermined time interval in the evacuative traveling mode.

In step S302, the control mode determination unit 601 determines whether or not a predetermined time T0 or more has elapsed from starting of evacuative traveling. The control mode determination unit 601 proceeds to step S304 in a case where the predetermined time T0 or more has not elapsed from starting of evacuative traveling, and proceeds to step S310 in a case where the predetermined time T0 or more has elapsed from starting of evacuative traveling.

In step S304, the control mode determination unit 601 determines whether or not a braking operation is performed by the driver on the basis of a detection signal from a brake switch or a master cylinder pressure sensor (neither illustrated). The control mode determination unit 601 proceeds to step S306 in a case where a braking operation is performed by the driver, and returns to step S302 so as to repeatedly perform the processes in steps S302 and S304 in a case where a braking operation is not performed by the driver.

In step S306, the notification signal output unit 604 outputs a notification signal indicating the content of prompting the vehicle to be stopped due to the braking operation, to the notification unit 90.

In step S308, the control mode determination unit 601 causes a control mode to transition the manual stop mode, and finishes the present process.

In the manual stop mode, in the same manner as in the evacuative traveling mode, the DDC control unit 701 controls an operation of the DC-DC converter 40 so that the voltage Vd2 at the terminal T2 of the DC-DC converter 40 becomes the allowable lowest voltage of the accessory loads 50. Specifically, the DDC control unit 701 controls an operation of the DC-DC converter 40 so that the voltage Vd2 at the terminal T2 becomes the maximum value among the respective allowable lowest voltages V1min, V2min, V3min of the general load 51, the first priority load 52, and the second priority load 53.

In the manual stop mode, operations of the first priority load 52 and the second priority load 53 may be prioritized. In other words, the DDC control unit 701 may control an operation of the DC-DC converter 40 so that the voltage Vd2 at the terminal T2 becomes the maximum value of the respective allowable lowest voltages V2min, V3min of the first priority load 52 and the second priority load 53.

On the other hand, in a case where it is determined that the predetermined time T0 or more has elapsed from starting of evacuative traveling in step S302, the notification signal output unit 604 outputs a notification signal indicating the content that an emergency stop is performed, to the notification unit 90 in step S310. Consequently, the notification unit 90 notifies the user (a driver or the like) of the vehicle of the content that an emergency stop is performed.

In step S312, the control mode determination unit 601 causes a control mode to transition to the emergency stop mode, and finishes the present process.

Next, with reference to FIG. 7, a description will be made of a manual stop mode process performed by the first power source ECU 60 and the second power source ECU 70. The process in this flowchart is repeatedly performed at a predetermined time interval in the manual stop mode.

In step S402, the control mode determination unit 601 determines whether or not the vehicle speed V is 0, that is, the vehicle is stopped on the basis of a vehicle speed signal received from the vehicle speed sensor (not illustrated). The control mode determination unit 601 proceeds to step S404 in a case where the vehicle is stopped, and proceeds to step S406 in a case where the vehicle is not stopped.

In step S404, the control mode determination unit 601 causes a control mode to transition to the stop maintaining mode, and finishes the present process.

In the stop maintaining mode, the first power source ECU 60 or the second power source ECU 70 operates an EPB, so that the vehicle is maintained in a stop state. In this case, the first power source ECU 60 or the second power source ECU 70 outputs an operation request to an ECU controlling an operation of the EPB, so as to operate the EPB.

In the stop maintaining mode, the alternator 21 and the DC-DC converter 40 may be in any control states.

On the other hand, in step S406, the control mode determination unit 601 determines whether or not a predetermined time T1 or more has elapsed from transition to the manual stop mode. The control mode determination unit 601 proceeds to step S408 in a case where the predetermined time T1 or more has elapsed from transition to the manual stop mode, and finishes the present process in a case where the predetermined time T1 or more has not elapsed from transition to the manual stop mode.

In step S408, the notification signal output unit 604 outputs a notification signal indicating the content that an emergency stop is performed, to the notification unit 90. Consequently, the notification unit 90 notifies the user (a driver or the like) of the vehicle of the content that an emergency stop is performed.

In step S410, the control mode determination unit 601 causes a control mode to transition to the emergency stop mode, and finishes the present process.

Next, with reference to FIG. 8, a description will be made of an emergency stop mode process performed by the first power source ECU 60 and the second power source ECU 70. The process in this flowchart is repeatedly performed at a predetermined time interval in the emergency stop mode.

In step S502, the control mode determination unit 601 determines whether or not the vehicle speed V is 0, that is, the vehicle is stopped on the basis of a vehicle speed signal received from the vehicle speed sensor (not illustrated). The control mode determination unit 601 proceeds to step S504 in a case where the vehicle is stopped, and finishes the present process in a case where the vehicle is not stopped.

In step S504, the control mode determination unit 601 causes a control mode to transition to the stop maintaining mode, and finishes the present process.

Next, with reference to FIG. 9, a description will be made of a specific operation of the power source system 1 based on the control processes illustrated in FIGS. 4 to 8.

Figure 9:
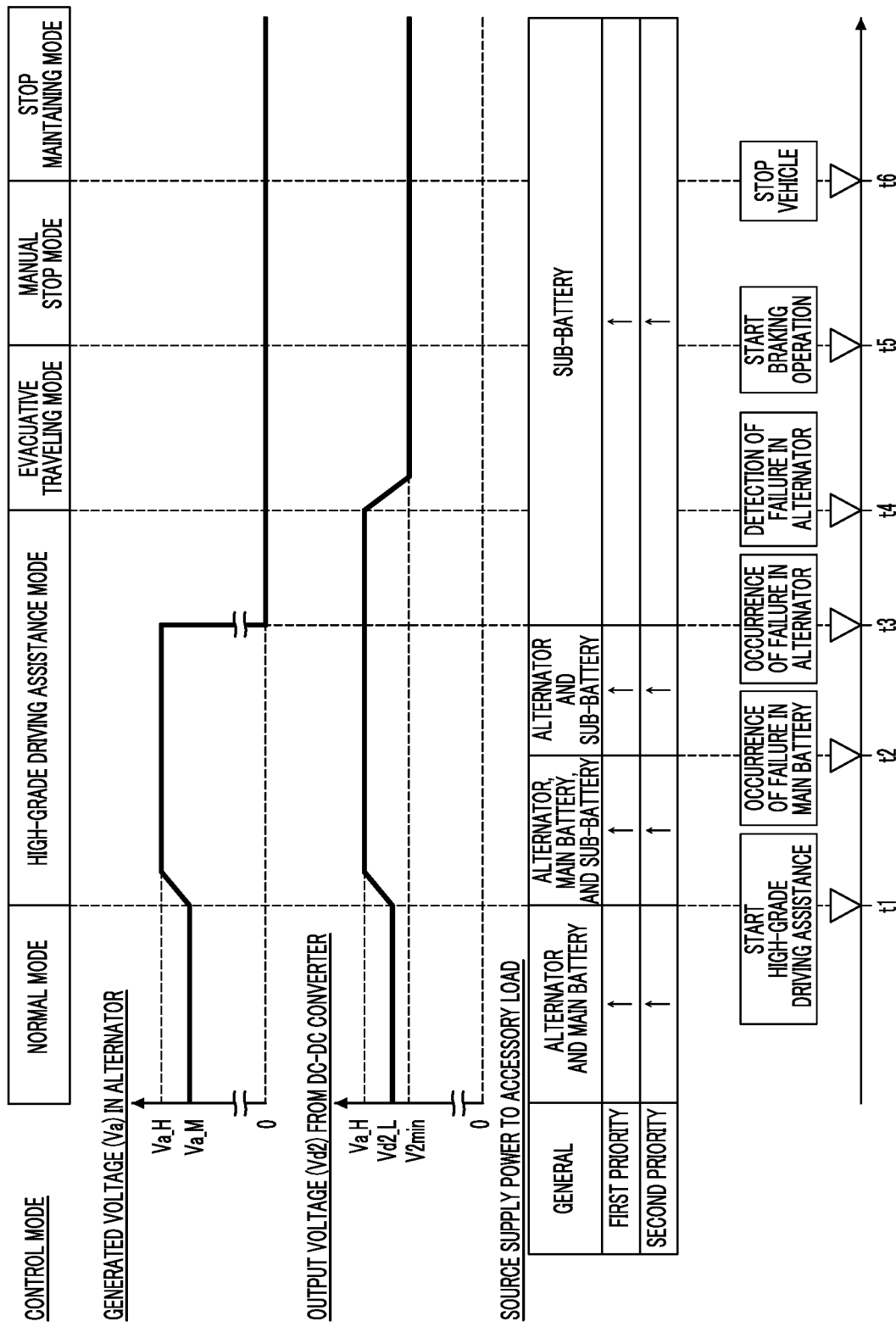
FIG. 9 is a timing chart illustrating an example of an operation of the power source system according to the first embodiment.

FIG. 9 is a timing chart illustrating an example of an operation of the power source system 1 according to the present embodiment. Specifically, FIG. 9 illustrates change situations over time of control modes, the generated voltage Va in the alternator 21, the voltage Vd2 at the terminal T2 of the DC-DC converter 40, and a source supplying power to the accessory loads 50.

In this example, in the normal mode, the description will be made assuming that the power generation control unit 602 controls an operation of the alternator 21 so that the generated voltage Va becomes a predetermined value Va_M. In this example, in the normal mode, the description will be made assuming that the DDC control unit 701 controls an operation of the DC-DC converter 40 so that the voltage Vd2 at the terminal T2 becomes a predetermined value Vd2_L. In this example, the description will be made assuming that the allowable lowest voltages V1min, V2min, V3min of the general load 51, the first priority load 52, and the second priority load 53 satisfy a relationship of V2min>V3min>V1min.

Since a control mode is the normal mode before a time point t1, as illustrated in FIG. 9, the generated voltage Va in the alternator 21 is maintained to be the predetermined value Va_M. As illustrated in FIG. 9, the voltage Vd2 at the terminal T2 of the DC-DC converter 40 is maintained to be the predetermined value Vd2_L lower than the generated voltage Va (=Va_M) in the alternator 21. Thus, as illustrated in FIG. 9, the accessory loads 50 is supplied with power from the alternator 21 and the main battery 22, that is, the main power source 20, and is not supplied with power from the sub-battery 30.

Thereafter, at the time point t1, if high-grade driving assistance (ACC control) is started (Y in step S104), a control mode transitions to the high-grade driving assistance mode (step S106). In the high-grade driving assistance mode, as described above, the generated voltage Va in the alternator 21 is increased to the predetermined value Va_H. In the high-grade driving assistance mode, as described above, the voltage Vd2 at the terminal T2 of the DC-DC converter 40 is maintained to be the same as the voltage Va (=Va_H) of the alternator 21. Thus, power is supplied to the accessory loads 50 from the sub-battery 30 in addition to the alternator 21 and the main battery 22, that is, the main power source 20.

Next, at a time point t2, since a failure occurs in the main battery 22, the main battery 22 cannot supply power to the accessory loads 50, and thus power is supplied to the accessory loads 50 from the alternator 21 and the sub-battery 30.

Thereafter, at a time point t3, since a failure occurs in the alternator 21, the alternator 21 cannot supply power to the accessory loads 50, and thus power is supplied to the accessory loads 50 from the sub-battery 30.

Thereafter, at a time point t4, if abnormality in the alternator 21 is detected by the abnormality detection unit 603 (Y in step S202), a control mode transitions to the evacuative traveling mode when an SOC of the sub-battery 30 is equal to or more than the predetermined threshold value S0 (Y in step S204). In the evacuative traveling mode, as described above, the voltage Vd2 at the terminal T2 of the DC-DC converter 40 is maintained to be the allowable lowest voltage of the accessory loads 50, that is, the allowable lowest voltage V2min of the first priority load 52.

Next, at a time point t5, if a braking operation is performed by the driver (step S304), a control mode transitions to the manual stop mode (step S308). In the manual stop mode, as described above, the voltage Vd2 at the terminal T2 of the DC-DC converter 40 is still maintained to be the allowable lowest voltage of the accessory loads 50, that is, the allowable lowest voltage V2min of the first priority load 52.

Next, at a time point t6, if the vehicle is stopped due to the braking operation performed by the driver (Y in step S402), a control mode transitions to the stop maintaining mode (step S404), and a stop state is maintained by the EPB as described above.

As mentioned above, in the present embodiment, in a case where the predetermined control (ACC control) related to the high-grade driving assistance system is performed, an operation of the DC-DC converter 40 is controlled so that power is supplied to the power path L1 from the sub-battery 30. Therefore, in a case where the predetermined control related to the high-grade driving assistance system is performed, power is supplied to the power path L1 from the sub-battery 30 via the DC-DC converter 40. In other words, when the predetermined control is performed, power from the sub-battery 30 is supplied to the first priority load 52 realizing the high-grade driving assistance system of the sub-battery 30 via the power paths L3, L31 as branches of the power path L1. Thus, even if a failure occurs in the main power source 20, and thus power is not supplied to the first priority load 52 from the main power source 20, the high-grade driving assistance system can be continuously operated as a result of being supplied with power from the sub-battery 30 without a time lag.

Next, a second embodiment will be described.

A power source system 1A according to the present embodiment is different from the power source system 1 of the first embodiment in that a relay R1 and power paths L4, L41, L42 (refer to FIG. 10) are additionally provided. The power source system 1A according to the present embodiment is different from the power source system 1 of the first embodiment in that the first power source ECU 60 and the second power source ECU 70 are respectively replaced with a first power source ECU 60A and a second power source ECU 70A (refer to FIGS. 11 and 12), specifically, the control mode determination unit 601 and the DDC control unit 701 are respectively replaced with a control mode determination unit 601A and a DDC control unit 701A (refer to FIGS. 11 and 12), and a relay control unit 703A (refer to FIG. 12) is additionally provided. Hereinafter, the same constituent elements as those in the first embodiment are given the same reference numerals, and differences from the first embodiment will be focused.

Figure 10:
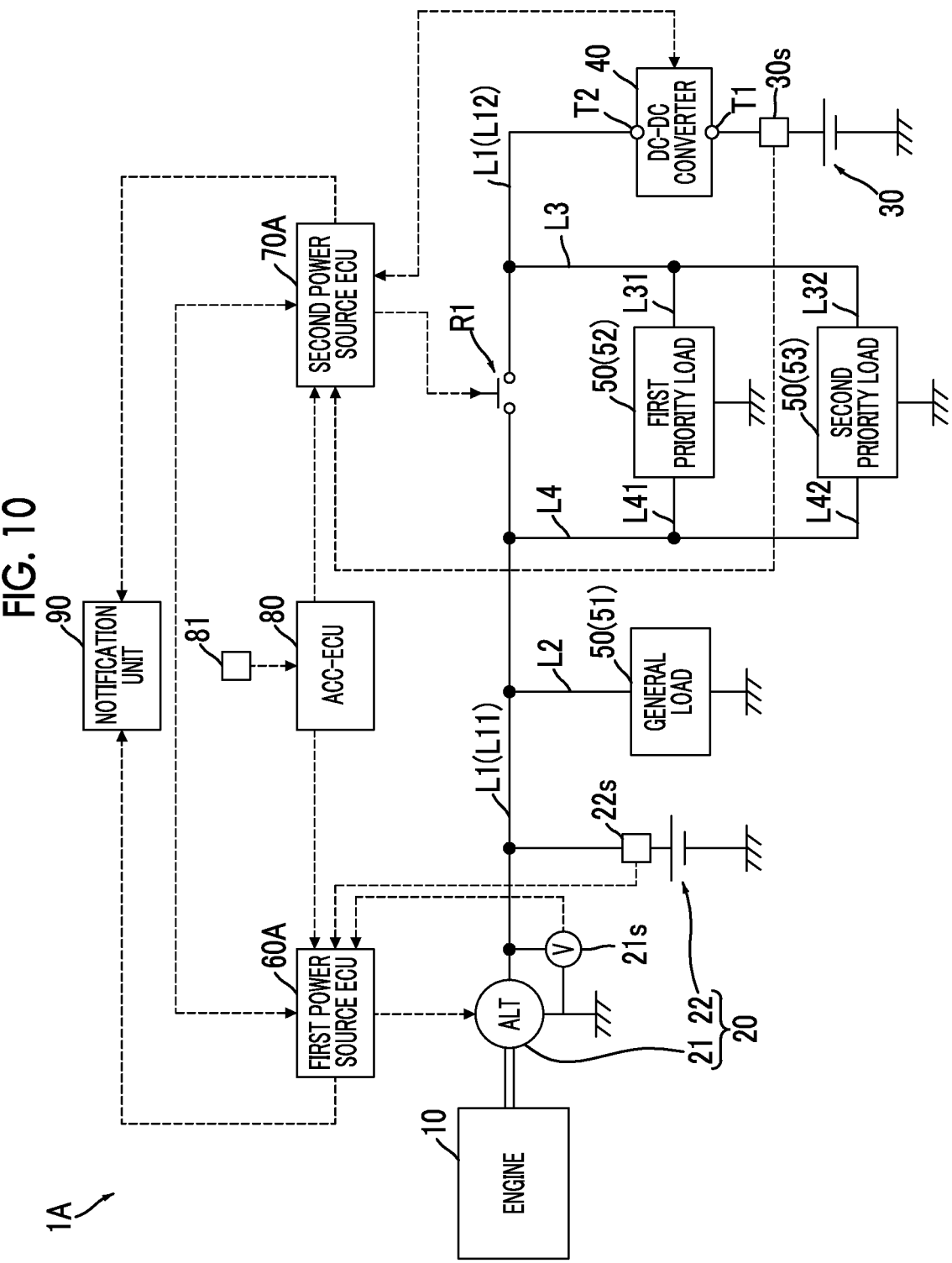
FIG. 10 is a configuration diagram schematically illustrating an example of a configuration of a power source system according to a second embodiment.
Figure 11:
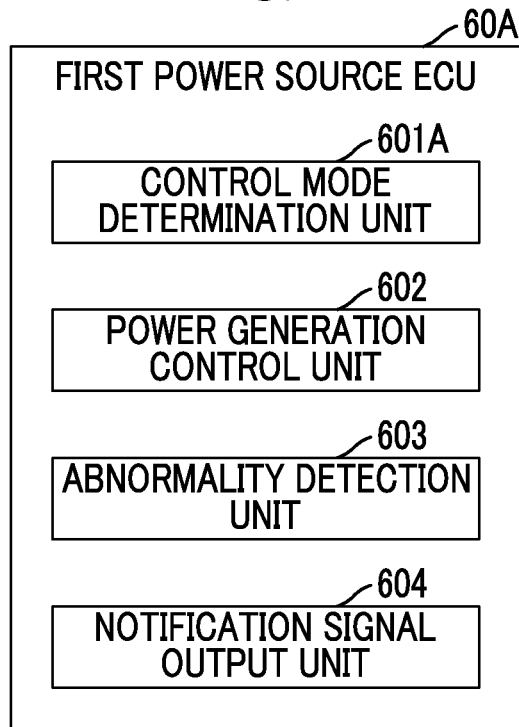
FIG. 11 is a functional block diagram of a first power source ECU according to the second embodiment.
Figure 12:
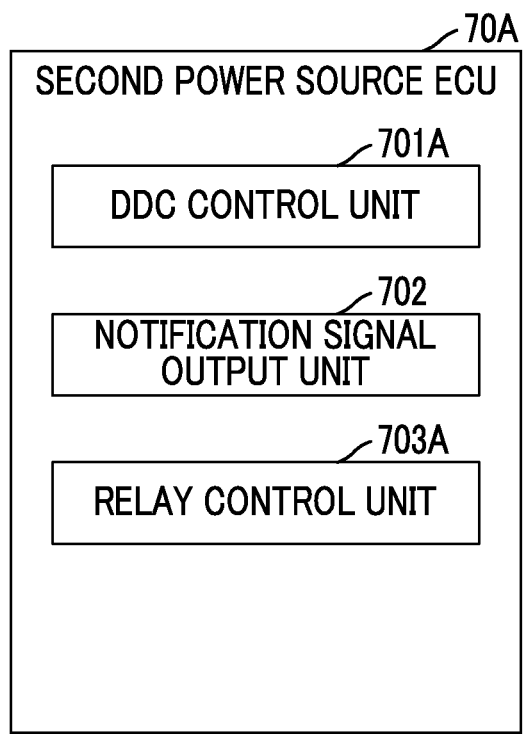
FIG. 12 is a functional block diagram of a second power source ECU according to the second embodiment.

FIG. 10 is a configuration diagram schematically illustrating a configuration of the power source system 1A according to the present embodiment. FIGS. 11 and 12 are respectively functional block diagrams of the first power source ECU 60A and the second power source ECU 70A.

The relay R1 is provided at a portion closer to the main power source 20 (the alternator 21 and the main battery 22) than the junction with the power path L3 on the power path L1. Specifically, the relay R1 is provided between the junction with the power path L2 and the junction with the power path L3 on the power path L1. Consequently, on the power path L1, a power path L11 closer to the main power source 20 than the relay R1 and a power path L12 closer to the sub-battery 30 (DC-DC converter 40) than the relay R1 can be electrically disconnected from each other. In other words, power from the sub-battery 30 cannot be made to be supplied to the main power source 20 or the general load 51 connected to the power path L11.

The power path L4 is provided in an aspect of diverging from the power path L11 between the relay R1 and the main power source 20, and is connected to the first priority load 52 and the second priority load 53. Specifically, the power path L4 further branches into the power path L41 and the power path L42, which are respectively connected to the first priority load 52 and the second priority load 53. In other words, the first priority load 52 and the second priority load 53 are connected to the power path L12 via the power path L3, and are connected to the power path L11 via the power path L4. Thus, even in a case where the relay R1 is turned off, the first priority load 52 and the second priority load 53 can be supplied with power from both of the main power source 20 and the sub-battery 30.

The power path L31 and the power path L41 are electrically disconnected from each other, and the power path L32 and the power path L42 are electrically disconnected from each other.

The control mode determination unit 601A and the DDC control unit 701A perform processes which are different from those in the first embodiment due to addition of the relay R1. Details thereof will be described later.

The relay control unit 703A controls an operation of the relay R1. In the normal mode, the relay control unit 703A fundamentally maintains the relay R1 in an ON state (closed state). Control states in the other control modes will be described later.

The relay control unit 703A may turn off the relay R1 according to other conditions (for example, a case where required power in the general load 51 is large, and power from the sub-battery 30 is desired to be supplied thereto as much as power supplied to the first priority load 52 and the second priority load 53) in the normal mode.

Next, with reference to FIGS. 13 to 15, control processes performed by the first power source ECU 60A and the second power source ECU 70A will be described in detail.

Figure 13:
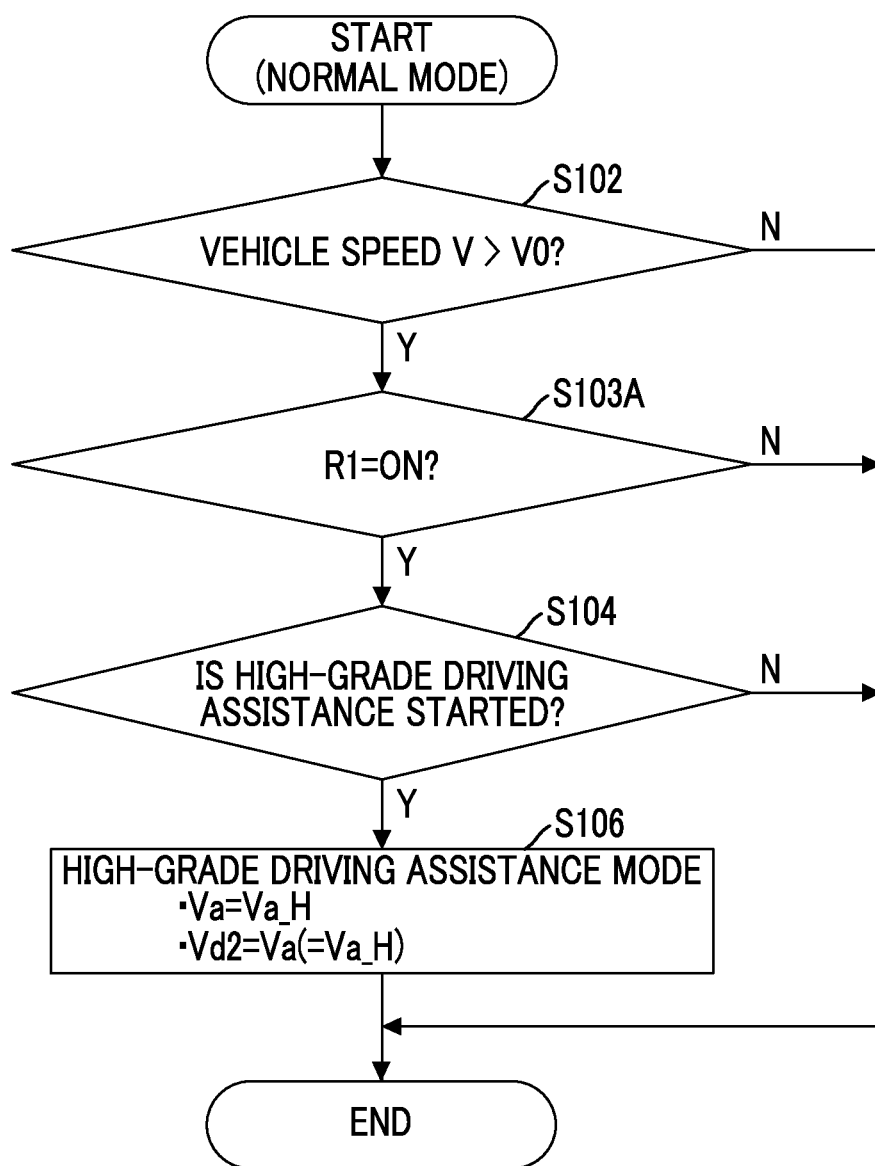
FIG. 13 is a flowchart schematically illustrating an example of a normal mode process in the power source system according to the second embodiment.

FIG. 13 is a flowchart schematically illustrating an example of a normal mode process performed by the first power source ECU 60A and the second power source ECU 70A. FIG. 14 is a flowchart schematically illustrating an example of a high-grade driving assistance mode process performed by the first power source ECU 60A and the second power source ECU 70A. FIG. 15 is a flowchart schematically illustrating an example of a control process (evacuative traveling mode process) in the evacuative traveling mode, performed by the first power source ECU 60A and the second power source ECU 70A.

A manual stop mode process and an emergency stop mode process in the present embodiment are illustrated in FIGS. 7 and 8 in the same manner as in the first embodiment, and thus description thereof will be omitted.

First, with reference to FIG. 13, a description will be made of a normal mode process performed by the first power source ECU 60A and the second power source ECU 70A. The process in this flowchart is repeatedly performed at a predetermined time interval in the normal mode.

In the same manner as in the first embodiment, in the normal mode, the alternator 21 and the DC-DC converter 40 may be in any control states.

This flowchart is the same as the flowchart illustrated in FIG. 4 except that a process in step S103A is added between step S102 and step S104, and thus a difference from the flowchart illustrated in FIG. 4 will be focused.

In step S106, when a control mode transitions to the high-grade driving assistance mode from the normal mode, the relay control unit 703A maintains an ON state (closed state) of the relay R1.

In a case where it is determined that the vehicle speed V of the vehicle is higher than the predetermined speed V0 in step S102, the control mode determination unit 601A determines whether or not the relay R1 is turned on (closed) in step S103A. The control mode determination unit 601A proceeds to step S104 in a case where the relay R1 is turned on, and finishes the present process in a case where the relay R1 is not turned on.

Next, with reference to FIG. 14, a description will be made of a high-grade driving assistance mode process performed by the first power source ECU 60A and the second power source ECU 70A. The process in this flowchart is repeatedly performed at a predetermined time interval in the high-grade driving assistance mode.

This flowchart is the same as the flowchart illustrated in FIG. 5 except that step S206 is replaced with step S206A, and thus a difference from the flowchart illustrated in FIG. 5 will be focused.

In the high-grade driving assistance mode, as described above, the relay R1 is maintained in an ON state (closed state). In step S216, when a control mode transitions to the emergency stop mode, the alternator 21, the DC-DC converter 40, and the relay R1 may be in any states.

In a case where an SOC of the sub-battery 30 is more than the predetermined threshold value S0 in step S204, the control mode determination unit 601A causes a control mode to transition to the evacuative traveling mode in step S206A.

In the evacuative traveling mode, the relay control unit 703A brings the relay R1 into an OFF state (opened state). Consequently, when a failure occurs in the main power source 20 (alternator 21), it is possible to prevent power which can be supplied to the first priority load 52 or the second priority load 53 from the sub-battery 30 from being reduced due to the power from the sub-battery 30 flowing into the main power source 20 (the main battery 22) or the general load 51. The DDC control unit 701A controls an operation of the DC-DC converter 40 so that the voltage Vd2 at the terminal T2 becomes the maximum value of the respective allowable lowest voltages V2min, V3min of the first priority load 52 and the second priority load 53. Consequently, in a situation in which abnormality occurs in the main power source 20 (alternator 21), the first priority load 52 and the second priority load 53 can be operated as a result of being supplied with power from the sub-battery 30. The voltage Vd2 supplied from the DC-DC converter 40 to the first priority load 52 and the second priority load 53 is limited to the allowable lowest voltage, and thus the first priority load 52 and the second priority load 53 can be driven for a longer period of time with power from the sub-battery 30.

In the same manner as in the first embodiment, in the evacuative traveling mode, the alternator 21 may be in any control state. In the same manner as in the first embodiment, in a case where a control mode transitions to the evacuative traveling mode, the first power source ECU 60A (or the second power source ECU 70A) notifies an ECU controlling an operation of the engine 10 of the content that a control mode transitions to the evacuative traveling mode.

Next, with reference to FIG. 15, a description will be made of an evacuative traveling mode process performed by the first power source ECU 60A and the second power source ECU 70A. The process in this flowchart is repeatedly performed at a predetermined time interval in the evacuative traveling mode.

This flowchart is the same as the flowchart illustrated in FIG. 6 except that step S308 is replaced with step S308A, and thus a difference from the flowchart illustrated in FIG. 6 will be focused.

In step S308A, the control mode determination unit 601A causes a control mode to transition to the manual stop mode, and finishes the present process.

In the manual stop mode, the DDC control unit 701A controls an operation of the DC-DC converter 40 so that the voltage Vd2 at the terminal T2 becomes the maximum value of the respective allowable lowest voltages V2min, V3min of the first priority load 52 and the second priority load 53.

In the manual stop mode, the relay control unit 703A brings the relay R1 into an OFF state (opened state) in the same manner as in a case of the evacuative traveling mode.

Next, with reference to FIG. 16, a description will be made of a specific operation of the power source system 1A based on the control processes illustrated in FIGS. 7, 8, and 13 to 15.

Figure 16:
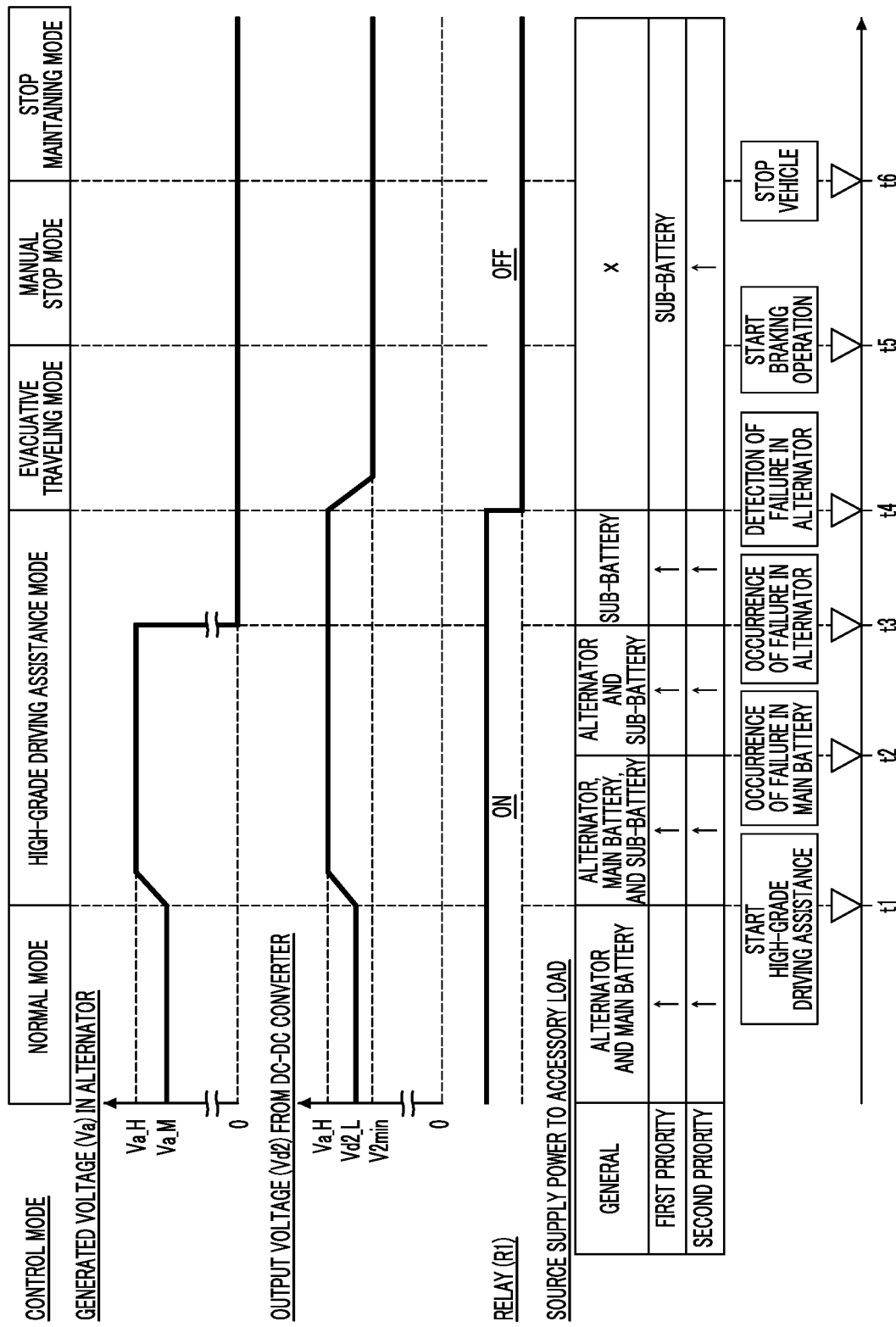
FIG. 16 is a timing chart illustrating an example of an operation of the power source system according to the second embodiment.

FIG. 16 is a timing chart illustrating an example of an operation of the power source system 1A according to the present embodiment. Specifically, FIG. 16 illustrates change situations over time of control modes, the generated voltage Va in the alternator 21, the voltage Vd2 at the terminal T2 of the DC-DC converter 40, ON and OFF states of the relay R1, and a source supplying power to the accessory loads 50.

In this example, in the same manner as in the case of FIG. 9, in the normal mode, the description will be made assuming that the power generation control unit 602 controls an operation of the alternator 21 so that the generated voltage Va becomes a predetermined value Va_M. In this example, in the same manner as in the case of FIG. 9, the description will be made assuming that, in the normal mode, the DDC control unit 701A controls an operation of the DC-DC converter 40 so that the voltage Vd2 at the terminal T2 becomes a predetermined value Vd2_L. In this example, in the same manner as in the case of FIG. 9, the description will be made assuming that the allowable lowest voltages V1min, V2min, V3min of the general load 51, the first priority load 52, and the second priority load 53 satisfy a relationship of V2min>V3min>V1min.

In the timing chart illustrated in FIG. 16, respective change situations of the control modes, the voltage Va of the alternator 21, and the voltage Vd2 at the terminal T2 of the DC-DC converter 40 are the same as those in the case of FIG. 9 before the time point t4. Thus, description thereof will be omitted.

As illustrated in FIG. 16, the relay R1 transitions to an ON state (closed state) in the normal mode and the high-grade driving assistance mode. Thus, changes of sources supplying power to the accessory loads 50 before the time point t4 are the same as those in the timing chart illustrated in FIG. 9.

At the time point t4, if abnormality in the alternator 21 is detected by the abnormality detection unit 603 (Y in step S202), a control mode transitions to the evacuative traveling mode when an SOC of the sub-battery 30 is equal to or more than the predetermined threshold value S0 (Y in step S204). In the evacuative traveling mode, as described above, the relay R1 is maintained in an OFF state (opened state). Therefore, in a state in which failures occur in the main power source 20 (the alternator 21 and the main battery 22), the supply of power from the sub-battery 30 is stopped, and thus power is not supplied to the general load 51. In the evacuative traveling mode, as described above, the voltage Vd2 at the terminal T2 of the DC-DC converter 40 is maintained to be the maximum value of the respective allowable lowest voltages of the first priority load 52 and the second priority load 53, that is, the allowable lowest voltage V2min of the first priority load 52.

Thereafter, changes of sources supplying power to the accessory loads 50 after the time point t5 are the same as those in the timing chart illustrated in FIG. 9 except that the relay R1 is turned off, and thus power is not supplied to the general load 51. Therefore, description thereof will be omitted.

As mentioned above, in the present embodiment, in a case where abnormality in the main power source 20 is not detected, the relay R1 is maintained in an ON state, and, in a case where abnormality in the main power source 20 is detected, the relay R1 is brought into an OFF state. Therefore, in a case where abnormality in the main power source is detected, the relay R1 is turned off so that power from the sub-battery 30 is not supplied to the main power source 20. Thus, when a failure occurs in the main power source 20, it is possible to prevent power from the sub-battery 30 supplied to the first priority load 52 realizing the high-grade driving assistance system from being reduced due to the power from the sub-battery 30 being supplied to the main battery 22.

Since the general load 51 is connected to the power path L11 via the power path L2, it is possible to prevent power from the sub-battery 30 supplied to the first priority load 52 from being reduced due to the power from the sub-battery 30 being supplied to the general load 51 when a failure occurs in the main power source 20.

The second priority load 53 related to the system realizing at least one of traveling and stopping of the vehicle according to a driving operation performed by the driver is connected to the power path L12 via the power path L32 and the power path L3. Thus, when a failure occurs in the main power source 20, even if the relay R1 transitions to an OFF state (opened state), the second priority load 53 can be operated with power from the sub-battery 30.

Next, a third embodiment will be described.

A power source system 1B according to the present embodiment is different from the power source system 1A of the second embodiment in that a relay R2 (refer to FIG. 17) is additionally provided. The power source system 1B according to the present embodiment is different from the power source system 1A of the second embodiment in that the first power source ECU 60A and the second power source ECU 70A are respectively replaced with a first power source ECU 60B and a second power source ECU 70B (refer to FIG. 17). Specifically, the power source system 1B according to the present embodiment is different from the power source system 1A of the second embodiment in that the control mode determination unit 601A, the DDC control unit 701A, and the relay control unit 703A are respectively replaced with a control mode determination unit 601B, a DDC control unit 701B, and a relay control unit 703B (none illustrated). Hereinafter, the same constituent elements as those in the first and second embodiments are given the same reference numerals, and differences from the first and second embodiments will be focused.

Figure 17:
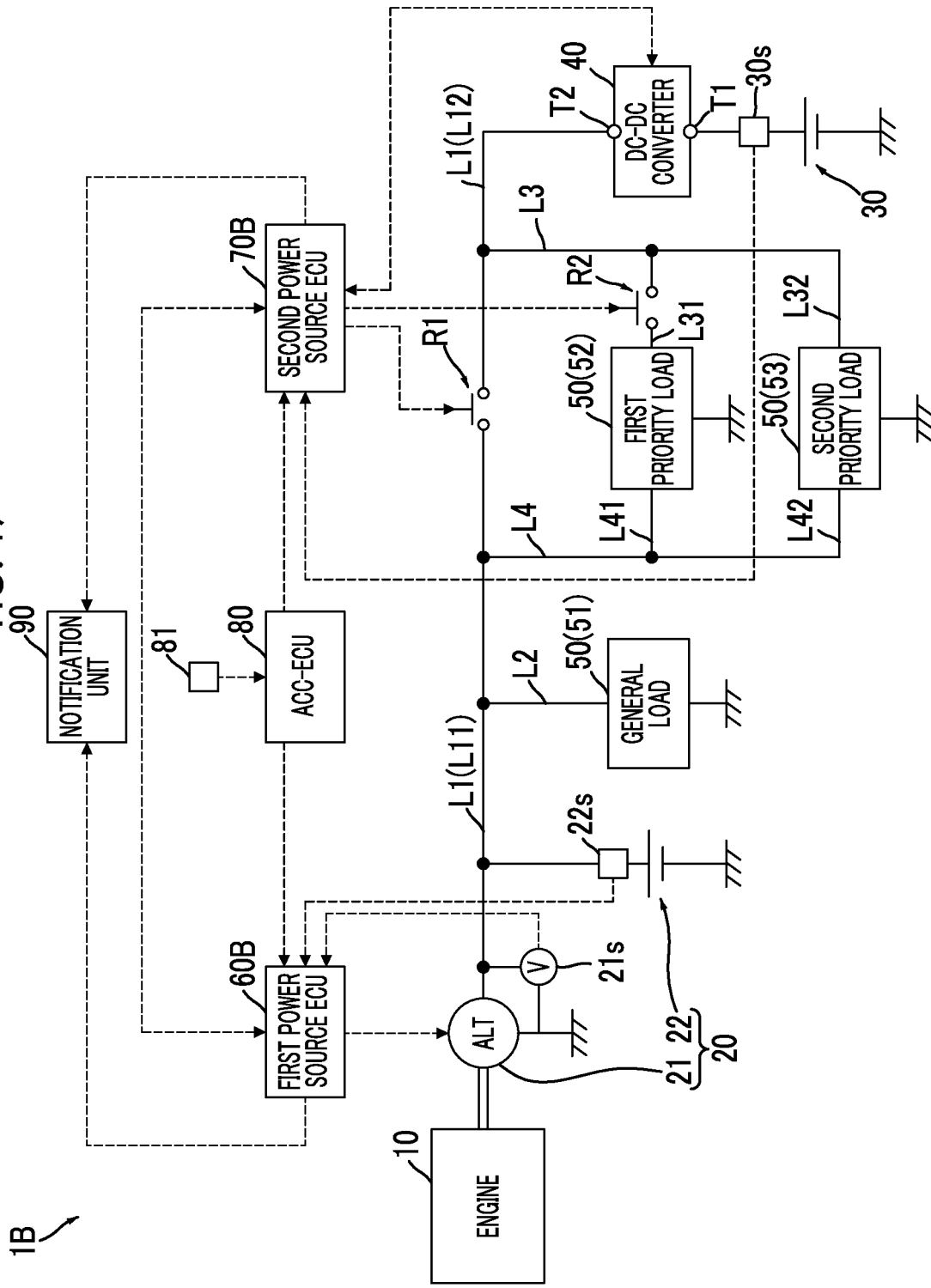
FIG. 17 is a configuration diagram schematically illustrating an example of a configuration of a power source system according to a third embodiment.

FIG. 17 is a configuration diagram schematically illustrating a configuration of the power source system 1B according to the present embodiment.

Functional block diagrams of the first power source ECU 60B and the second power source ECU 70B are the same as FIGS. 11 and 12 except that the letter "A" is replaced with the letter "B", and are thus omitted.

The relay R2 is provided on the power path L31. Consequently, power supplied from the sub-battery 30 can be supplied to the second priority load 53, and can be made not to be supplied to the first priority load 52, via the power path L12 and the power path L3.

The control mode determination unit 601B and the DDC control unit 701B perform processes which are different from those in the first and second embodiments due to addition of the relay R2. Details thereof will be described later.

The relay control unit 703B controls operations of the relays R1, R2. The relay control unit 703B maintains the relay R1 in an ON state (closed state) in the normal mode. The relay control unit 703B maintains the relay R2 in an OFF state (opened state) in the normal mode. Control states in the other control modes will be described later.

The relay control unit 703B may turn off the relay R1 according to other conditions in the normal mode in the same manner as in the first and second embodiments.

Next, with reference to FIGS. 18 and 19, control processes performed by the first power source ECU 60B and the second power source ECU 70B will be described in detail.

Figure 18:
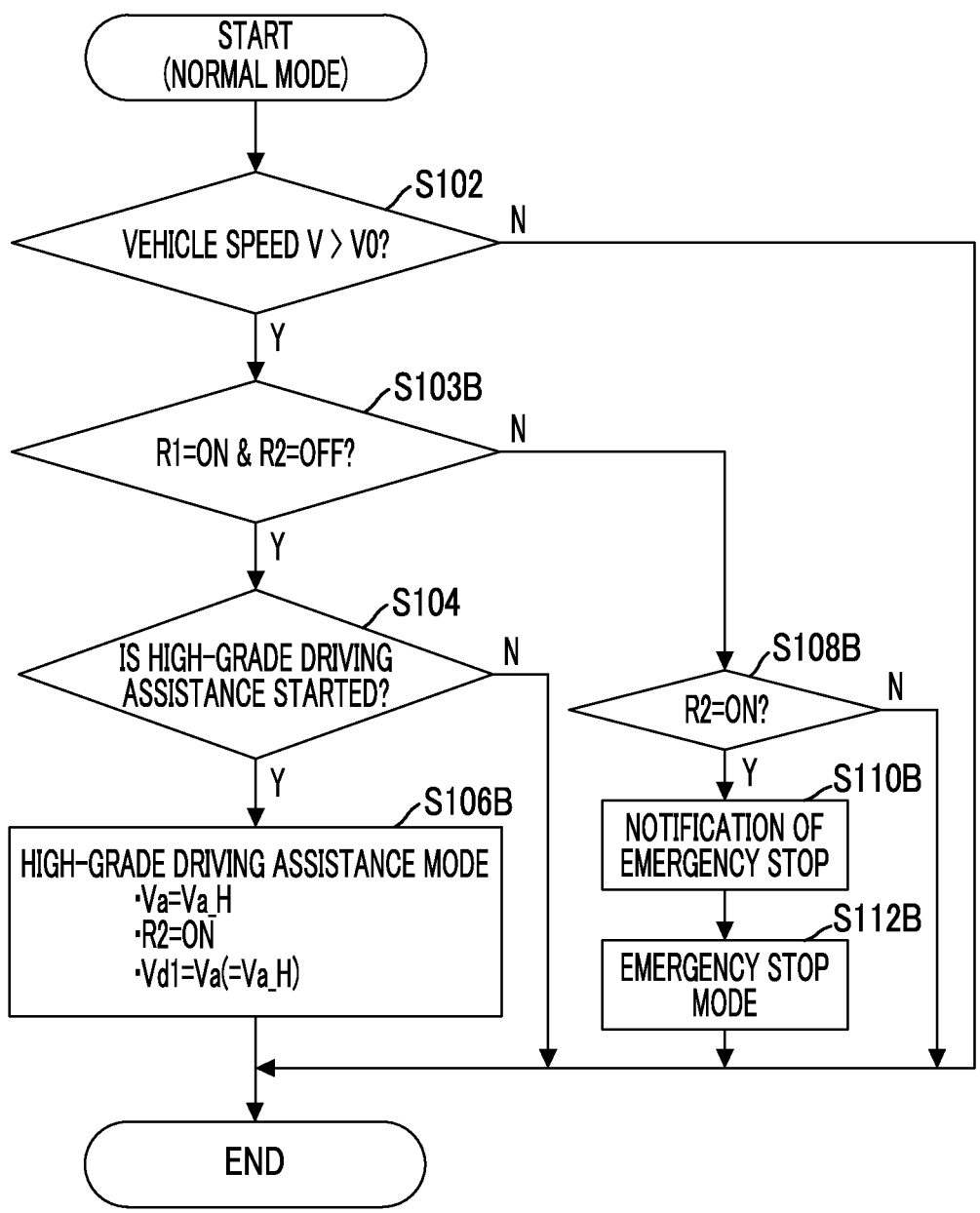
FIG. 18 is a flowchart schematically illustrating an example of a normal mode process in the power source system according to the third embodiment.
Figure 19:
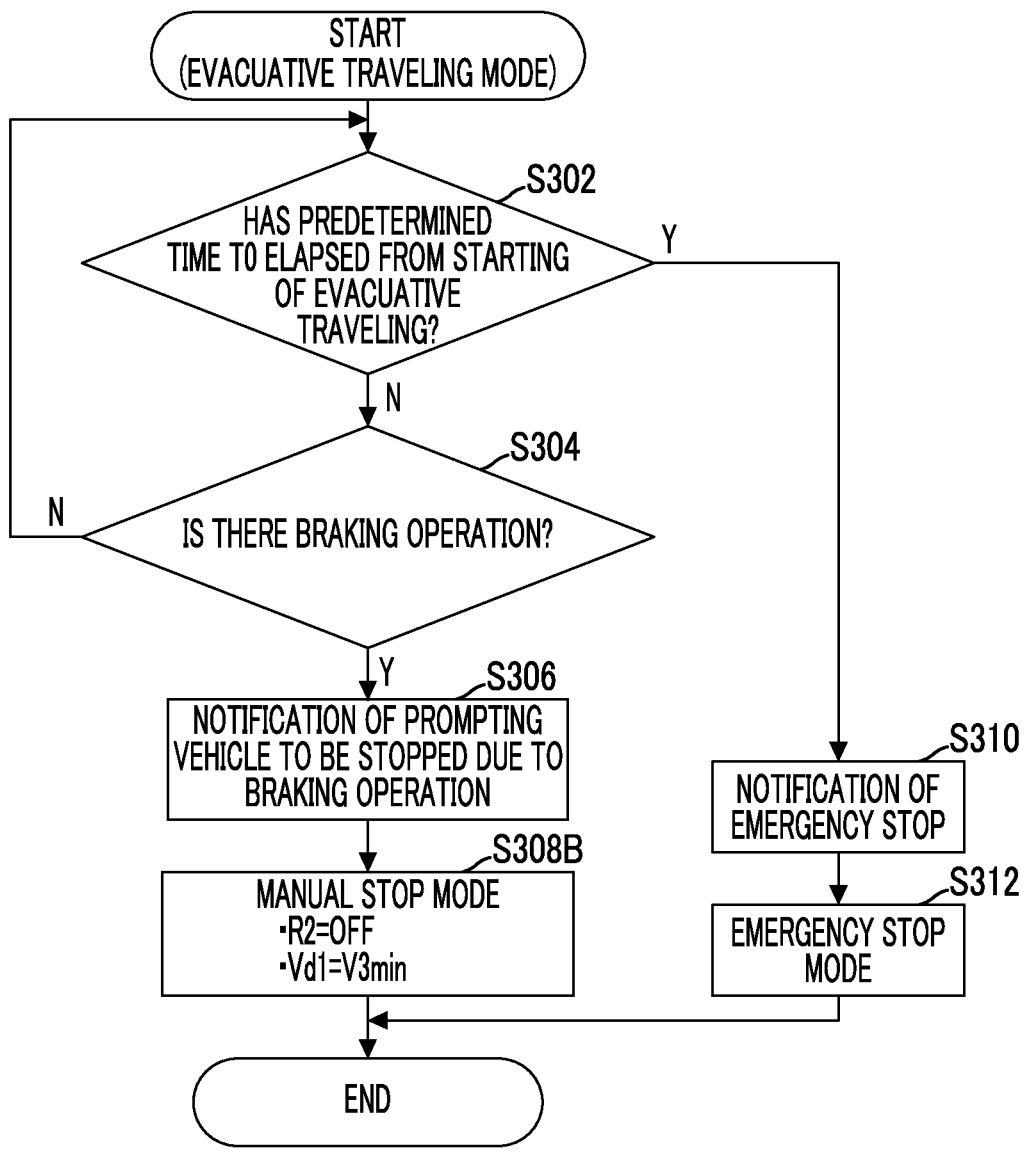
FIG. 19 is a flowchart schematically illustrating an example of an evacuative traveling mode process in the power source system according to the third embodiment.

FIG. 18 is a flowchart schematically illustrating an example of a normal mode process in the normal mode, performed by the first power source ECU 60B and the second power source ECU 70B. FIG. 19 is a flowchart schematically illustrating an example of an evacuative traveling mode process performed by the first power source ECU 60B and the second power source ECU 70B.

Figure 14:
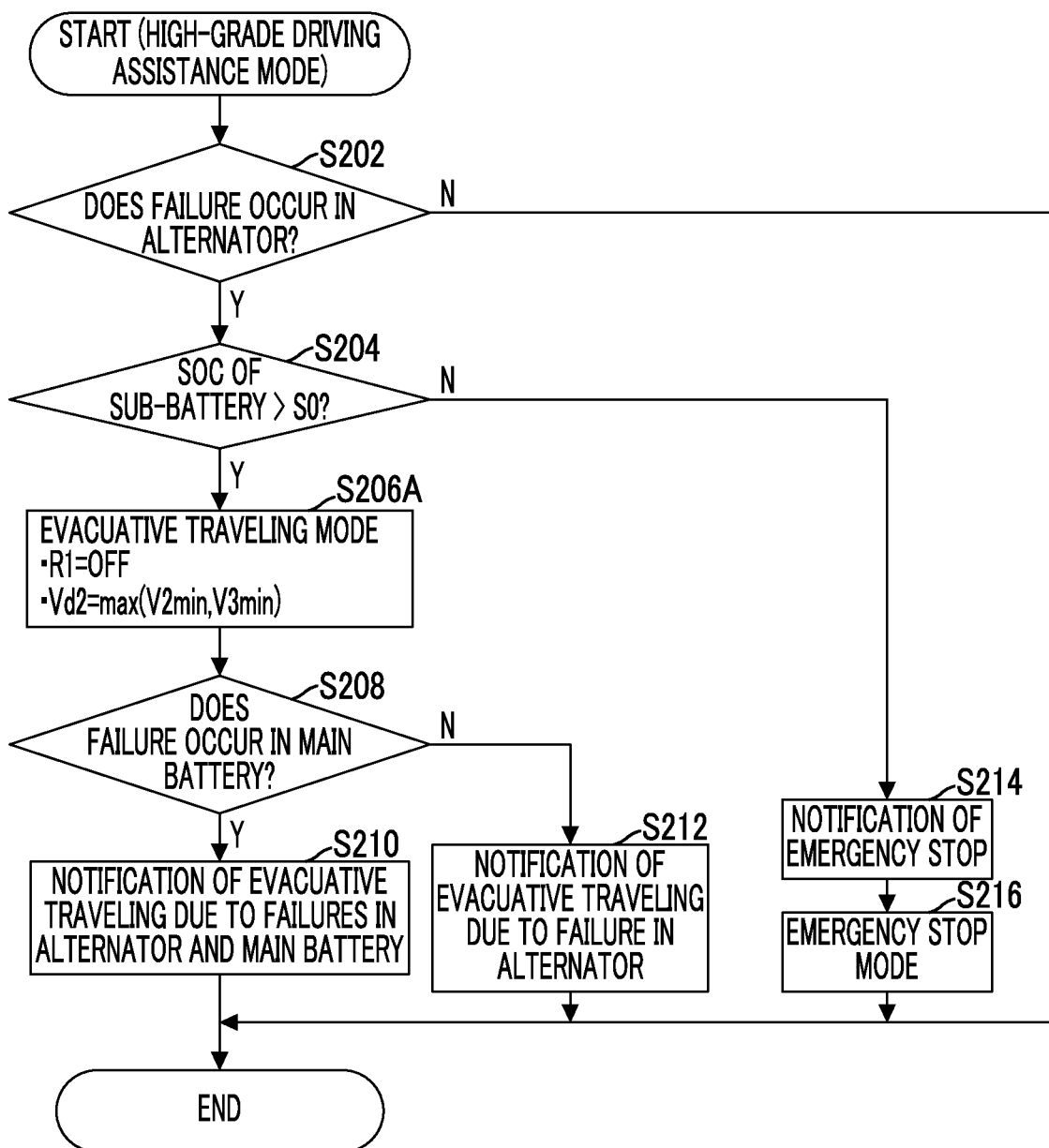
FIG. 14 is a flowchart schematically illustrating an example of a high-grade driving assistance mode process in the power source system according to the second embodiment.

A high-grade driving assistance mode process, a manual stop mode process, and an emergency stop mode process in the present embodiment are illustrated in FIG. 14, and FIGS. 7 and 8 in the same manner as in the first and second embodiments, and thus description thereof will be omitted.

First, with reference to FIG. 18, a description will be made of a normal mode process performed by the first power source ECU 60B and the second power source ECU 70B. The process in this flowchart is repeatedly performed at a predetermined time interval in the normal mode.

In the same manner as in the first and second embodiments, in the normal mode, the alternator 21 and the DC-DC converter 40 may be in any control states.

This flowchart is the same as the flowchart illustrated in FIG. 13 except that step S103A and step S106 are respectively replaced with step S103B and step S106B, and processes in steps S108B to S112B are added, and thus differences from the flowchart illustrated in FIG. 13 will be focused.

In a case where it is determined that the vehicle speed V of the vehicle is higher than the predetermined speed V0 in step S102, the control mode determination unit 601B determines whether or not the relay R1 is turned on (closed), and the relay R2 is turned off (opened) in step S103B. The control mode determination unit 601B proceeds to step S104 in a case where the relay R1 is turned on, and the relay R2 is turned off, and proceeds to step S108B if otherwise.

In a case where it is determined that high-grade driving assistance is started in step S104, the control mode determination unit 601B causes a control mode to transition to the high-grade driving assistance mode in step S106B, and finishes the present process.

In the same manner as in the first and second embodiments, in the high-grade driving assistance mode, the power generation control unit 602 controls an operation of the alternator 21 so that the generated voltage Va in the alternator 21 becomes the relatively high predetermined voltage Va_H. In the same manner as in the first and second embodiments, in the high-grade driving assistance mode, the DDC control unit 701B controls the DC-DC converter 40 so that the voltage Vd2 at the terminal T2 of the DC-DC converter 40 is the same as the voltage Va (=Va_H) of the alternator 21. In the high-grade driving assistance mode, the relay control unit 703B brings the relay R2 into an ON state (closed state). Consequently, power is supplied from the sub-battery 30 to the first priority load 52 via the power path L12, the power path L3, and the power path L31.

On the other hand, in step S103B, in a case where it is not determined that the relay R1 is turned on, and the relay R2 is turned off, the control mode determination unit 601B determines whether or not the relay R2 is turned on in step S108B. In a case where the relay R2 is turned on, the control mode determination unit 601B determines that abnormality occurs in the relay R2 (for example, the relay R2 is fixed to an ON state), and proceeds to step S110B. In a case where the relay R2 is not turned on, the control mode determination unit 601B finishes the present process.

In step S110B, the notification signal output unit 604 outputs a notification signal indicating the content that an emergency stop is performed, to the notification unit 90.

Consequently, the notification unit 90 notifies the user (a driver or the like) of the vehicle of the content that an emergency stop is performed.

In step S112B, the control mode determination unit 601B causes a control mode to transition to the emergency stop mode, and finishes the present process.

In the emergency stop mode, the alternator 21 and the DC-DC converter 40 may be in any control states in the same manner as in the first and second embodiments. In the emergency stop mode, the relays R1, R2 may be in any control states.

Next, with reference to FIG. 19, a description will be made of an evacuative traveling mode process performed by the first power source ECU 60B and the second power source ECU 70B. The process in this flowchart is repeatedly performed at a predetermined time interval in the evacuative traveling mode.

Figure 15:
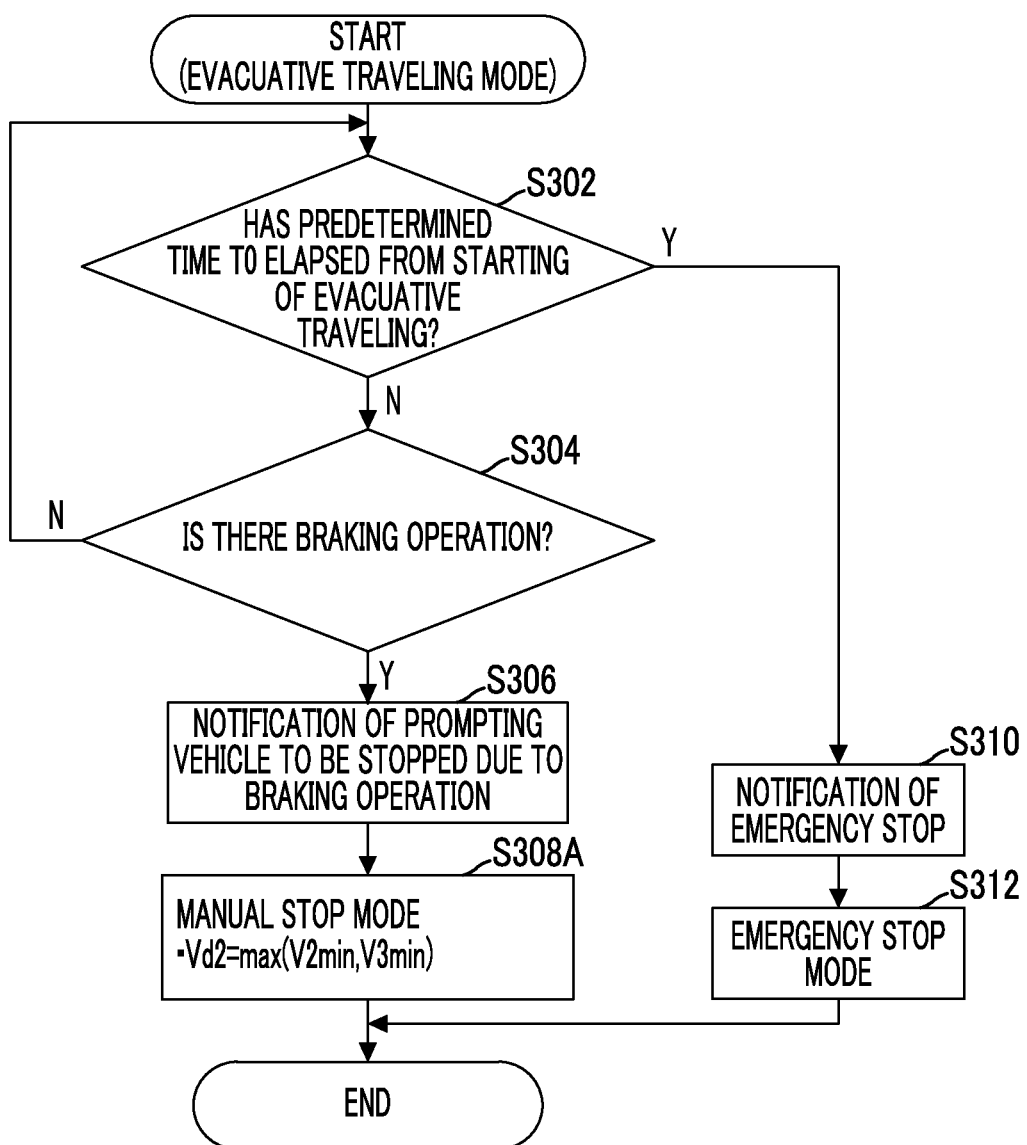
FIG. 15 is a flowchart schematically illustrating an example of an evacuative traveling mode process in the power source system according to the second embodiment.

This flowchart is the same as the flowchart illustrated in FIGS. 6 and 15 except that the processes in steps S308 and S308A are replaced with a process in step S308B, and thus a difference from the flowchart illustrated in FIGS. 6 and 15 will be focused.

In step S308B, the control mode determination unit 601B causes a control mode to the manual stop mode, and finishes the present process.

In the manual stop mode, the relay control unit 703B brings the relay R2 into an OFF state (opened state). In the manual stop mode, the DDC control unit 701B controls an operation of the DC-DC converter 40 so that the voltage Vd2 at the terminal T2 becomes the allowable lowest voltage V3min of the second priority load 53.

In the manual stop mode, the relay control unit 703B brings the relay R1 into an OFF state (opened state) in the same manner as in a case of the evacuative traveling mode.

Next, with reference to FIG. 20, a description will be made of a specific operation of the power source system 1B based on the control processes illustrated in FIGS. 7, 8, 14, 18 and 19.

Figure 20:
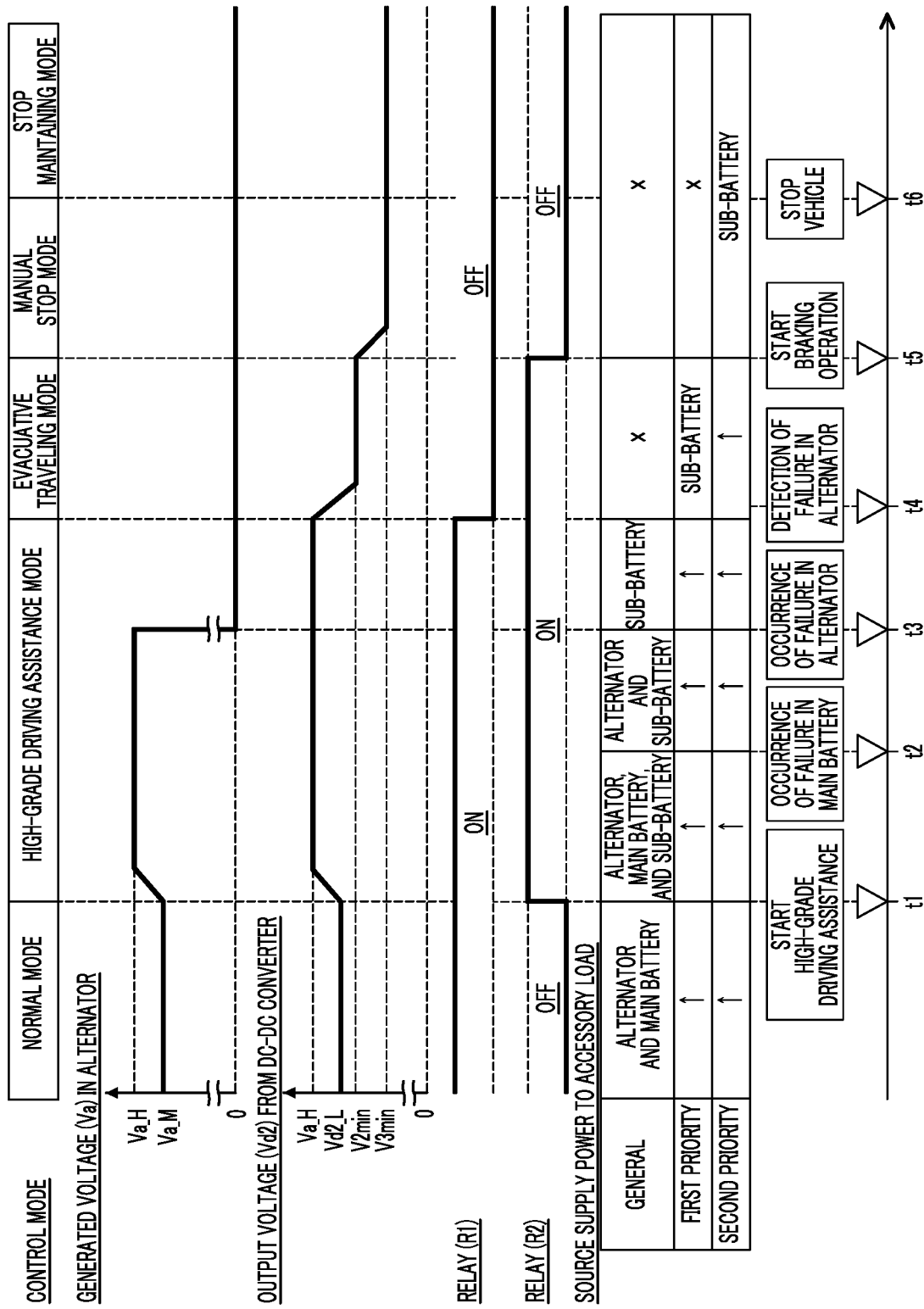
FIG. 20 is a timing chart illustrating an example of an operation of the power source system according to the third embodiment.

FIG. 20 is a timing chart illustrating an example of an operation of the power source system 1B according to the present embodiment. Specifically, FIG. 20 illustrates change situations over time of control modes, the generated voltage Va in the alternator 21, the voltage Vd2 at the terminal T2 of the DC-DC converter 40, ON and OFF states of the relay R1, ON and OFF states of the relay R2, and a source supplying power to the accessory loads 50.

In this example, in the same manner as in the case of FIGS. 9 and 16, in the normal mode, the description will be made assuming that the power generation control unit 602 controls an operation of the alternator 21 so that the generated voltage Va becomes a predetermined value Va_M. In this example, in the same manner as in the case of FIGS. 9 and 16, in the normal mode, the description will be made assuming that the DDC control unit 701B controls an operation of the DC-DC converter 40 so that the voltage Vd2 at the terminal T2 becomes a predetermined value Vd2_L. In this example, in the same manner as in the case of FIGS. 9 and 16, the description will be made assuming that the allowable lowest voltages V1min, V2min, V3min of the general load 51, the first priority load 52, and the second priority load 53 satisfy a relationship of V2min>V3min>V1min.

Since a control mode is the normal mode before the time point t1, as illustrated in FIG. 20, the generated voltage Va in the alternator 21 is maintained to be the predetermined value Va_M. The voltage Vd2 at the terminal T2 of the DC-DC converter 40 is maintained to be the predetermined value Vd2_L lower than the generated voltage Va (=Va_M) in the alternator 21. Thus, the accessory loads 50 is supplied with power from the alternator 21 and the main battery 22, that is, the main power source 20, and is not supplied with power from the sub-battery 30.

Before the time point t1, the relay R1 is brought into an ON state, and the relay R2 is maintained in an OFF state (opened state). Thus, the first priority load 52 can be supplied with power from both of the main power source 20 and the sub-battery 30 via the power path L4 and the power path L41.

Thereafter, at the time point t1, if high-grade driving assistance (ACC control) is started (Y in step S104), a control mode transitions to the high-grade driving assistance mode (step S106). In the high-grade driving assistance mode, as described above, the generated voltage Va in the alternator 21 is increased to the predetermined value Va_H. In the high-grade driving assistance mode, as described above, the voltage Vd2 at the terminal T2 of the DC-DC converter 40 is maintained to be the same as the voltage Va (=Va_H) of the alternator 21. Thus, power is supplied to the accessory loads 50 from the sub-battery 30 in addition to the alternator 21 and the main battery 22, that is, the main power source 20.

The relay R1 is maintained in an ON state even after the time point t1. At the time point t1, the relay R2 is turned on as described above when a control mode transitions to the high-grade driving assistance mode.

Next, at the time point t2, since a failure occurs in the main battery 22, the main battery 22 cannot supply power to the accessory loads 50, and thus power is supplied to the accessory loads 50 from the alternator 21 and the sub-battery 30.

Thereafter, at the time point t3, since a failure occurs in the alternator 21, the alternator 21 cannot supply power to the accessory loads 50, and thus power is supplied to the accessory loads 50 from the sub-battery 30.

Thereafter, at the time point t4, if abnormality in the alternator 21 is detected by the abnormality detection unit 603 (Y in step S202), a control mode transitions to the evacuative traveling mode when an SOC of the sub-battery 30 is equal to or more than the predetermined threshold value S0 (Y in step S204). In the evacuative traveling mode, as described above, the relay R1 is brought into an OFF state (opened state). Thus, the supply of power from the sub-battery 30 is stopped in a state in which a failure occurs in the main power source 20 (the alternator 21 and the main battery 22), and thus power is not supplied to the general load 51. In the evacuative traveling mode, as described above, the voltage Vd2 at the terminal T2 of the DC-DC converter 40 is maintained to be the allowable lowest voltage of the first priority load 52 and the second priority load 53, that is, the allowable lowest voltage V2min of the first priority load 52.

Next, at the time point t5, if a braking operation is performed by the driver (step S304), a control mode transitions to the manual stop mode (step S308B). In the manual stop mode, as described above, the relay R2 is brought into an OFF state (opened state). In the manual stop mode, as described above, the voltage Vd2 at the terminal T2 of the DC-DC converter 40 is maintained to be the allowable lowest voltage V3min of the second priority load 53. Thus, the supply of power from the sub-battery 30 is stopped in a state in which a failure occurs in the main power source 20 (the alternator 21 and the main battery 22), and thus power is not supplied to the first priority load 52.

Next, at the time point t6, if the vehicle is stopped due to the braking operation performed by the driver (Y in step S402), a control mode transitions to the stop maintaining mode (step S404), and a stop state is maintained by the EPB as described above.

As mentioned above, in the present embodiment, the relay R2 is provided on the power path L31. In a case where the predetermined control (ACC control) related to the high-grade driving assistance system is performed, the relay R2 is maintained in a closed state. Even in a case where the predetermined control is performed, the relay R2 is brought into an opened state if abnormality occurs in the main power source 20, and a braking operation is performed by a driver. Therefore, in a case where the predetermined control is performed, fundamentally, the relay R2 is brought into a closed state, and the first priority load 52 realizing the high-grade driving assistance system is operated with power from the sub-battery 30. On the other hand, even in a case where the predetermined control is performed, if abnormality in the main power source 20 is detected, and a braking operation is performed by a driver, the relay R2 is turned off, and thus the supply of power from the sub-battery 30 to the first priority load 52 is stopped. Thus, in a case where the driver wants to stop the vehicle through the braking operation when abnormality occurs in the main power source 20, it is possible to prevent the occurrence of a competitive situation between the predetermined control and the braking operation performed by the driver. In other words, the vehicle can be appropriately stopped through the braking operation performed by the driver.

Next, a description will be made of a first modification example of the above-described embodiment.

Figure 21:
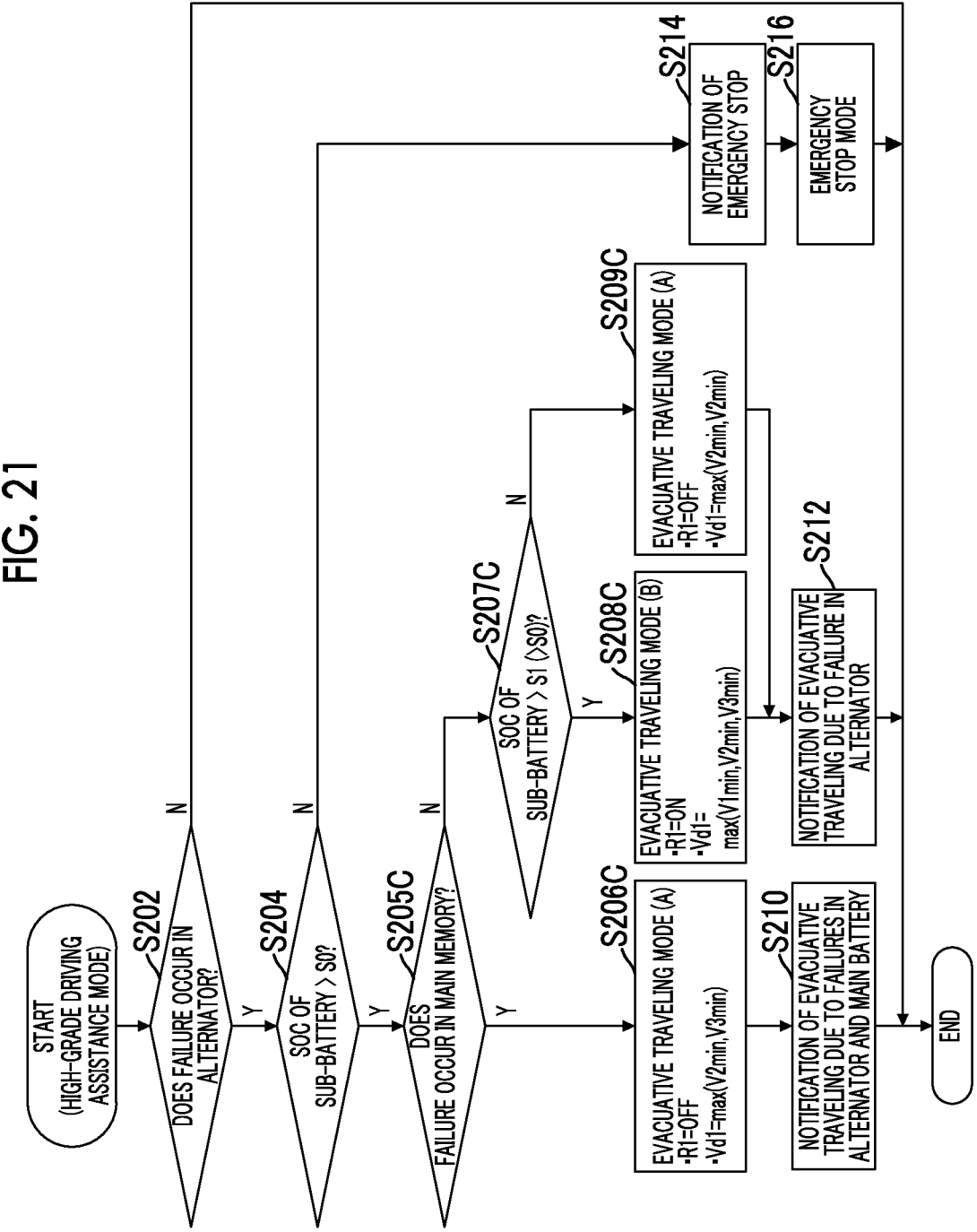
FIG. 21 is a flowchart schematically illustrating an example of a high-grade driving assistance mode process in a power source system according to a first modification example of the third embodiment.

In the present modification example, a process illustrated in a flowchart of FIG. 21 is obtained by changing a part of the high-grade driving assistance mode process (FIG. 12) according to the third embodiment.

FIG. 21 is a flowchart schematically illustrating an example of a high-grade driving assistance mode process performed by the first power source ECU 60B and the second power source ECU 70B according to the first modification example of the third embodiment. The process in this flowchart is repeatedly performed at a predetermined time interval in the high-grade driving assistance mode.

In the present modification example, the evacuative traveling mode includes two modes (an evacuative traveling A mode and an evacuative traveling B mode), and the above-described process illustrated in FIG. 20 is performed even if a control mode transitions to either of the two modes.

This flowchart is the same as the flowchart illustrated in FIG. 14 except that the processes in steps S206A and S208 are replaced with processes in step S205C to S209C, and thus a difference from the flowchart illustrated in FIG. 14 will be focused.

In a case where it is determined that an SOC of the sub-battery 30 is more than the predetermined threshold value S0 in step S204, the abnormality detection unit 603 determines whether or not there is abnormality in the main battery 22 in step S205C. The abnormality detection unit 603 proceeds to step S206C in a case where there is abnormality in the main battery 22, and proceeds to step S207C in a case where there is no abnormality in the main battery 22.

In step S206C, the control mode determination unit 601B causes a control mode to transition to the evacuative traveling A mode, and proceeds to step S210.

In the evacuative traveling A mode, the relay control unit 703B brings the relay R1 to an OFF state (opened state).

Consequently, when a failure occurs in the main power source 20 (specifically, the main battery 22), it is possible to prevent power which can be supplied to the first priority load 52 or the second priority load 53 from the sub-battery 30 from being reduced due to the power from the sub-battery 30 flowing into the main battery 22 or the general load 51. The DDC control unit 701B controls an operation of the DC-DC converter 40 so that the voltage Vd2 at the terminal T2 becomes the maximum value of the respective allowable lowest voltages V2min, V3min of the first priority load 52 and the second priority load 53. Consequently, in a situation in which abnormality occurs in the main power source 20 (alternator 21), the first priority load 52 and the second priority load 53 can be operated as a result of being supplied with power from the sub-battery 30. The voltage Vd2 supplied from the DC-DC converter 40 to the first priority load 52 and the second priority load 53 is limited to the allowable lowest voltage, and thus the first priority load 52 and the second priority load 53 can be driven for a longer period of time with power from the sub-battery 30.

On the other hand, in step S207C, the control mode determination unit 601B determines whether or not an SOC of the sub-battery 30 is more than a predetermined threshold value S1 (>S0). The control mode determination unit 601B proceeds to step S208C in a case where an SOC of the sub-battery 30 is more than the predetermined threshold value S1, and proceeds to step S209C in a case where an SOC of the sub-battery 30 is not more than the predetermined threshold value S1.

In step S208C, the control mode determination unit 601B causes a control mode to transition to the evacuative traveling B mode, and proceeds to step S212.

In the evacuative traveling B mode, the relay control unit 703B brings the relay R2 into an ON state (closed state). Consequently, in a situation in which a residual capacity of the sub-battery 30 is sufficient (that is, a situation in which the SOC is more than the predetermined threshold value S1), power from the sub-battery 30 can be supplied to the main battery 22 or the general load 51.

In step S209C, the control mode determination unit 601B causes a control mode to transition to the evacuative traveling A mode, and proceeds to step S212.

As described above, in the evacuative traveling A mode, the relay control unit 703B brings the relay R1 to an OFF state (opened state). Consequently, in a situation in which a residual capacity of the sub-battery 30 is not sufficient, it is possible to prevent power which can be supplied to the first priority load 52 or the second priority load 53 from the sub-battery 30 from being reduced due to the power from the sub-battery 30 flowing into the main battery 22 or the general load 51.

In a case where a failure does not occur in the main battery 22 (Y in step S205C) regardless of a residual capacity of the sub-battery 30, a control mode may transition to the evacuative traveling B mode. In other words, steps S207C and S209C may be omitted. The evacuative traveling A mode and the evacuative traveling B mode may be selected (steps S207C to 209C) on the basis of an SOC of the sub-battery 30 regardless of the presence or absence of the abnormality (Y or N in step S205C) in the main battery 22. In other words, a process flow may be employed in which step S206A in FIG. 14 is used instead, and the processes in steps S207C to S209C are used. The high-grade driving assistance mode process (FIG. 20) according to the first modification example may be naturally used instead of the high-grade driving assistance mode process (FIG. 14) according to the second embodiment.

Next, a description will be made of a second modification example of the above-described embodiment.

Figure 22:
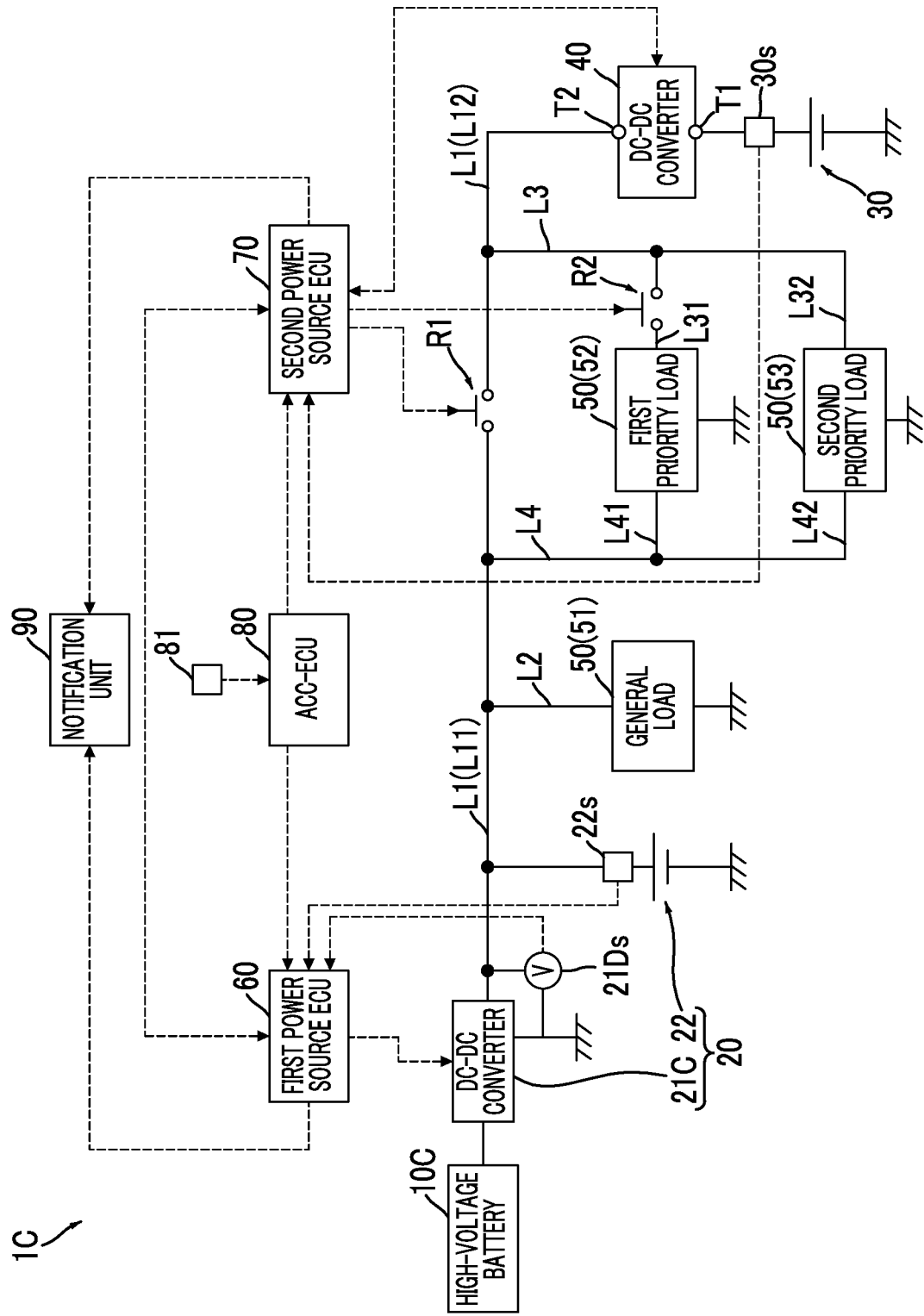
FIG. 22 is a configuration diagram schematically illustrating a configuration of a power source system according to a second modification example of the third embodiment.

FIG. 22 is a configuration diagram schematically illustrating an example of a configuration of a power source system 1C according to the second modification example of the third embodiment. In the present modification example, the engine 10 in the third embodiment (FIG. 17) is replaced with a high-voltage battery 10C driving an electric motor (not illustrated). In the present modification example, the main power source 20 in the third embodiment (FIG. 17) is replaced with a main power source 20C, and, specifically, the alternator 21 is replaced with a DC-DC converter 21C which steps down power from the high-voltage battery 10C and supplies the stepped-down power to the accessory loads 50. In other words, the power source system 1C is mounted on an electric motor vehicle having the electric motor driven with power from the high-voltage battery 10C as a drive power source.

The control processes (FIGS. 7, 8, 14, 18 and 19) related to the above-described third embodiment may be applied to the power source system 1C according to the second modification example. In other words, the alternator 21 may be replaced with the DC-DC converter 21C in the processes shown in FIGS. 7, 8, 14, 18 and 19. Consequently, it is possible to achieve the same operations and effects as those in the above-described third embodiment.

The configuration illustrated in FIG. 22 may be naturally applied to the first and second embodiments. In other words, the engine 10 and the main power source 20 (alternator 21) illustrated in FIG. 1 and FIG. 10 may be replaced with the high-voltage battery 10C and the main power source 20C (DC-DC converter 21C). Also in this configuration, the same operations and effects as those in the above-described first and second embodiments can be achieved.

As mentioned above, the embodiments of the present disclosure have been described in detail, but the present disclosure is not limited to such specific embodiments, and may be variously modified or altered.

For example, in the above-described embodiments, if traveling control related to high-grade driving assistance is started, a control mode immediately transitions to the high-grade driving assistance mode, but any other configuration may be used. For example, there is a high-grade driving assistance system such as an LKA system or an automatic brake system which does not intervene (or intervenes less) in a driver's driving operation as long as predetermined intervention conditions (for example, a condition in which it can be determined that a vehicle is deviated relative to traveling lanes, or a condition in which it can be determined that a probability of colliding with an obstacle is equal to or more than a predetermined criterion) are not satisfied. Therefore, in the high-grade driving assistance system which performs intervention control for steering the vehicle or braking the vehicle through intervention regardless of a driving operation performed by the driver of the vehicle if a predetermined intervention condition is established as the predetermined control, a control mode may transition to a high-grade driving assistance mode process in a case where it is determined that intervention related to the high-grade driving assistance system is more dominant in vehicle traveling than a driving operation performed by the driver after the predetermined control is started. In other words, the control mode determination units 601, 601A, 601B in the respective above-described embodiments may cause a control mode to transition to the high-grade driving assistance mode in a case where the predetermined control related to the high-grade driving assistance system is performed, and it is determined that a situation occurs in which intervention based on the predetermined control is more preferentially performed than a driving operation performed by a driver. Consequently, a timing at which power is supplied from the sub-battery 30 to the accessory loads 50 (first priority load 52) can be made to be delayed until the predetermined control related to the high-grade driving assistance system becomes necessary, and thus it is possible to reduce consumption of power from the sub-battery 30.

For example, in a case where a frequency of the number of times of intervention in a driving operation based on the predetermined control related to the high-grade driving assistance system is equal to or more than a predetermined criterion, it may be determined that a situation occurs in which intervention based on the predetermined control is more preferentially performed than a driving operation performed by a driver. For example, in a case where current consumption in the first priority load 52 is equal to or more than a predetermined criterion indicating an operation of an electric actuator requiring a relatively large current, it may be determined that a situation occurs in which intervention based on the predetermined control is more preferentially performed than a driving operation performed by a driver.

What is claimed is:

1. A power source system comprising:
a first power source that is mounted on a vehicle;
a second power source that is mounted on the vehicle;
a Direct Current to Direct Current converter that is mounted on the vehicle and is connected to the second power source, and that is configured to adjust power supplied from the second power source so as to output the adjusted power to a first path connected to the first power source;
a first load that is mounted on the vehicle, includes a vehicle control device configured to perform predetermined control regarding at least one of traveling, steering, and braking of the vehicle regardless of a driving operation performed by a driver of the vehicle, and an electric actuator as a control target of the vehicle control device, and is connected to the first path so as to be supplied with power from the first power source;
a first power source control device that is mounted on the vehicle, and is configured to control an operation of the first power source such that the first power source supplies a larger amount of power when the predetermined control is performed compared to when the predetermined control is not performed, and
a second power source control device that is mounted on the vehicle, and is configured to control an operation of the Direct Current to Direct Current converter such that a voltage of the Direct Current to Direct Current converter is equal to or substantially equal to a voltage of the first power source when the predetermined control is performed,
wherein the second power source is located on an opposite side of the Direct Current to Direct Current converter from the first power source in the first path.

2. The power source system according to claim 1, wherein the power source control device is configured to supply power from the second power source to the first path such that a voltage which is output from the Direct Current to Direct Current converter to the first path substantially matches a voltage of the first power source.

3. The power source system according to claim 1, wherein the power source control device is configured to control an operation of the Direct Current to Direct Current converter such that power from the second power source is not supplied to the first path in a case where the predetermined control is not performed.

4. The power source system according to claim 1, further comprising a first relay that is mounted on the vehicle,
   wherein the first load is connected to a second path diverging from the first path,
   wherein the first relay is provided at a portion closer to the first power source than a junction with the second path on the first path, and
   wherein the power source control device is configured to: maintain the first relay in an ON state in a case where abnormality in the first power source is not detected; and bring the first relay into an OFF state in a case where abnormality in the first power source is detected.

5. The power source system according to claim 4, further comprising a second relay that is mounted on the vehicle, and is provided on the second path,
   wherein the power source control device is configured to: bring the second relay into an ON state in a case where the predetermined control is performed; and
   bring the second relay into an OFF state in a case where abnormality in the first power source is detected, and a braking operation performed by a driver of the vehicle is detected, even when the predetermined control is performed.

6. The power source system according to claim 4,
   wherein the first power source includes a first power storage device, and
   wherein the power source control device is configured to bring the first relay into an OFF state in a case where abnormality in the first power source is detected, and the abnormality in the first power source includes abnormality in the first power storage device.

7. The power source system according to claim 4,
   wherein the second power source includes a second power storage device, and
   wherein the power source control device is configured to bring the first relay into an OFF state in a case where abnormality in the first power source is detected, and a state of charge of the second power storage device is equal to or less than a predetermined threshold value.

8. The power source system according to claim 4, further comprising
   a second load that is mounted on the vehicle, performs at least one of traveling and stopping of the vehicle in response to the driving operation performed by the driver of the vehicle, and is connected to a third path diverging from between the first relay and the Direct Current to Direct Current converter on the first path.

9. The power source system according to claim 8, further comprising
   a third load that is mounted on the vehicle, has an operation priority lower than operation priorities of the first load and the second load, and is connected to a fourth path diverging from between the first power source and the first relay on the first path.

10. The power source system according to claim 1,
   wherein the predetermined control causes intervention for steering or braking the vehicle regardless of the driving operation performed by the driver of the vehicle if a predetermined intervention condition is established, and
   wherein the power source control device is configured to control the operation of the Direct Current to Direct Current converter such that power from the second power source is supplied to the first path in a case where the predetermined control is performed, and it is determined that a situation occurs in which the intervention is more preferentially performed than the driving operation performed by the driver of the vehicle.

* * * * *